US012596975B1

(12) United States Patent
Torpen et al.

(10) Patent No.: US 12,596,975 B1
(45) Date of Patent: Apr. 7, 2026

(54) AUTOMATED MULTI-DIMENSIONAL DATA PROCESSING SYSTEM

(71) Applicant: StepAhead AS, Oslo (NO)

(72) Inventors: Andreas Torpen, Oslo (NO); Fredrik Solheim, Oslo (NO)

(73) Assignee: StepAhead AS, Oslo (NO)

( * ) Notice: Subject to any disclaimer, the term of this patent is extended or adjusted under 35 U.S.C. 154(b) by 0 days.

(21) Appl. No.: 19/008,362

(22) Filed: Jan. 2, 2025

(51) Int. Cl.
*G06Q 10/06* (2023.01)
*G06Q 10/0631* (2023.01)

(52) U.S. Cl.
CPC .............................. *G06Q 10/06313* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 12,182,505 | B1 * | 12/2024 | Davies | G06F 40/186 |
| 2018/0298746 | A1 * | 10/2018 | Short | E21B 41/00 |
| 2019/0377602 | A1 * | 12/2019 | Mosca | G06Q 10/0635 |
| 2020/0311319 | A1 * | 10/2020 | Qiao | G06F 18/24 |
| 2021/0073449 | A1 * | 3/2021 | Segev | G06F 30/27 |
| 2023/0065870 | A1 * | 3/2023 | Pyzow | G06N 3/10 |
| 2024/0104470 | A1 * | 3/2024 | Cohen | G06Q 10/0633 |

FOREIGN PATENT DOCUMENTS

WO WO-2025042777 A2 * 2/2025

OTHER PUBLICATIONS

Standfield B, Holterman E, Waddell R (2024) Spatial and Temporal Data Alignment from Disparate Sources for Feature Association. (National Institute of Standards and Technology, Gaithersburg, MD), NIST Grant/Contractor Report (GCR) NIST GCR 24-050. https://doi.org/10.6028/NIST.GCR.24-050, Apr. 2024. (Year: 2024).*

* cited by examiner

*Primary Examiner* — Kurtis Gills
(74) *Attorney, Agent, or Firm* — Outlier Patent Attorneys, PLLC

(57) ABSTRACT

A multi-dimensional data processing system is disclosed for the automated ingestion, normalization, and computational mapping of project data across spatial, temporal, and regulatory dimensions. The system operates by ingesting diverse datasets—including two-dimensional schematics, three-dimensional data models, cost structures, and workforce logistics—and normalizing them within a unified schema. A dimensional calculations model enables the system to computationally align normalized data with spatial zones, project phases, and operational constraints, structuring it for further computational processing. By integrating this mapped data within a coordinated digital environment, the system applies task sequencing and resource allocation algorithms, generating optimized project plans that support complex, multi-dimensional data interoperability. The structured data is further configured for display through an interactive visualization interface, allowing computational resources to facilitate real-time analysis and adaptive data-driven project management.

20 Claims, 13 Drawing Sheets

Figure 2:
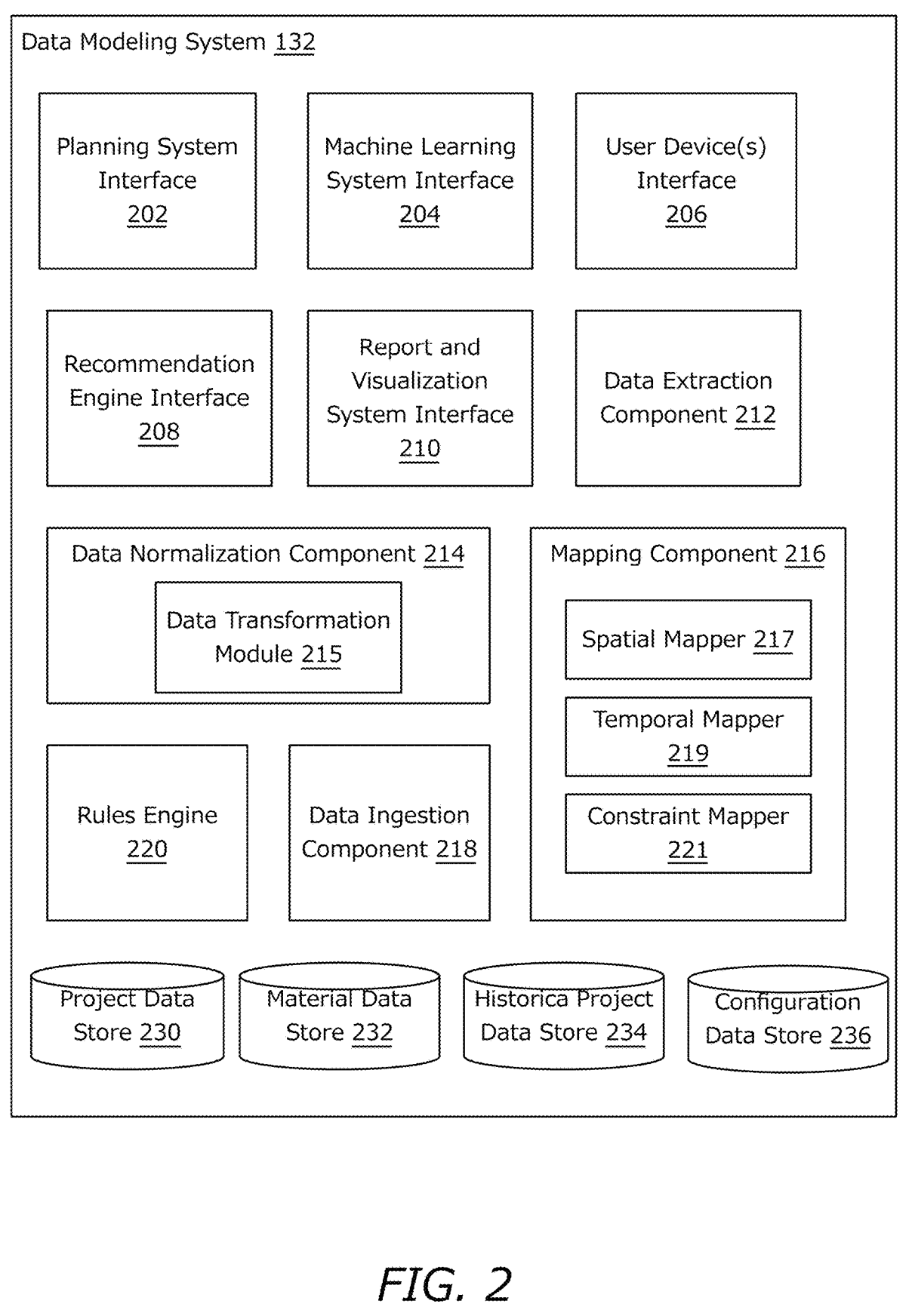

Data Modeling System 132

Planning System Interface 202

Machine Learning System Interface 204

User Device(s) Interface 206

Recommendation Engine Interface 208

Report and Visualization System Interface 210

Data Extraction Component 212

Data Normalization Component 214

Data Transformation Module 215

Mapping Component 216

Spatial Mapper 217

Temporal Mapper 219

Constraint Mapper 221

Rules Engine 220

Data Ingestion Component 218

Project Data Store 230

Material Data Store 232

Historica Project Data Store 234

Configuration Data Store 236

Ingest data (e.g., 2D drawings, 3D drawing (e.g., BIM model) , costs, labor reports, etc.)

604

Preprocess and normalize data

606

Map normalized data to dimensional calculations

608

Generate optimized project plans

609

No

Optimized?

Yes

610

Provide project plan

*700*

*608*

*702*

Receive mapped project data from 3D model

*704*

Identify project constraints and objectives

*706*

Apply optimization algorithms

*708*

Evaluate generated project plan

*710*

Adjust plan?

*Yes*

*No*

*712*

Finalize optimized project plan

AUTOMATED MULTI-DIMENSIONAL DATA PROCESSING SYSTEM

BACKGROUND

Field of the Art

The systems and methods disclosed herein relate generally to data processing systems and, more specifically, to systems and methods for capturing, processing, and integrating multi-dimensional data from diverse sources into a unified three-dimensional model for generating optimized data structures and resource allocation mappings used in computational analysis and visualization.

Discussion of the State of the Art

In the construction and project management sectors, data from various sources, including two-dimension (2D) drawings, 3D Building Information Models (BIM), labor and material cost databases, and project specifications, must be integrated to develop accurate project plans and execution strategies. Existing project management tools often operate in silos, relying on manual data entry and organization, which introduces errors and inefficiencies. These conventional systems lack the capability to dynamically integrate and utilize diverse data sources, making it difficult to achieve a cohesive view of project requirements and timelines. The two technologies adopted at scale mainly digitalize the current processes (digital document management and Building Information Modelling) or report and monitor data. While they are meant to improve productivity by, for example, improving engineering and planning or reducing rework, these are not functional in a way that would fundamentally transform ways of working for the majority of workers. These technologies have in common that they mainly focus on control rather than productivity.

Traditional project management tools primarily serve as digital organizers, offering limited support for advanced data integration and automation. As a result, project managers often have to manually reconcile disparate data sources, relying on personal experience or basic software tools that provide only rudimentary planning functionalities. This manual reconciliation process introduces data silos, inconsistencies, and delays, which can ultimately impact project costs, timelines, and quality of execution.

Attempts to introduce more sophisticated data management techniques have generally focused on automating specific aspects of project management, such as scheduling or resource allocation. However, these approaches are often constrained by a lack of integration between data sources, leading to fragmented project datasets that do not provide a unified view of project scope and status. Additionally, these systems may rely on static rule-based methodologies, which lack the adaptability needed to handle real-time project changes and updates.

There is a need for an integrated system that can automate the collection, organization, and utilization of data from heterogeneous sources. Such a system should be able to dynamically adjust project plans and schedules based on real-time data updates, reduce reliance on manual inputs, and enable efficient and accurate project planning and execution.

SUMMARY

Systems and methods in accordance with the embodiments described herein address deficiencies in traditional construction project planning and management systems by utilizing a multi-dimensional data processing framework configured to integrate unstructured data sources into a unified dimensional calculations model. Unlike systems reliant on BIM (Building Information Modeling) inputs, the approaches described herein are capable of creating actionable project plans and optimizing resource allocations using unstructured data, such as tender bid documents and project specifications, without requiring structured BIM data.

In particular, the systems described herein process and link heterogeneous data-including two-dimensional (2D) drawings, unstructured project documentation, cost information, and workforce logistics-into a structured, multi-dimensional schema. This schema aligns project quantities, labor requirements, and construction activities with corresponding spatial zones, timeline phases, and regulatory constraints.

In one embodiment, the systems include a data extraction and normalization module that ingests data from various heterogeneous sources. The module employs techniques such as optical character recognition (OCR), natural language processing (NLP), and semantic mapping to identify and extract relevant information, standardizing it into a common schema. By leveraging these techniques, the system reduces manual data handling and enhances data consistency across all stages of project planning.

The dimensional calculations model provides a foundation for automated project planning and optimization by analyzing interdependencies between project elements and resource availability. For example, the model applies optimization algorithms to dynamically adjust task sequencing, resource scheduling, and compliance adherence based on project constraints and real-time updates. These adjustments are iteratively refined to improve performance metrics, such as project duration, resource utilization, and adherence to regulatory requirements.

In various embodiments, the system supports collaborative mode, enabling the coordination of multi-disciplinary projects involving multiple contractors. The system tracks staffing plans, labor requirements, and construction activities across different project zones and timeline phases, while providing users the ability to toggle between subcontractor activities and define dependencies between tasks. The system uses learning mechanisms to automatically suggest staffing plans and resolve dependencies based on historical data and ongoing project updates.

In addition, the system supports single-organization mode, enabling the monitoring and optimization of staffing plans across multiple projects within the same organization. By dynamically reallocating resources in response to new projects or changing requirements, the system ensures efficient staffing and resource utilization at an organizational level.

Machine learning modules further enhance the system's capabilities by analyzing integrated project datasets to predict potential delays, resource bottlenecks, and cost overruns. The system continuously learns from historical and real-time data, enabling proactive adjustments to project execution plans, such as recommending task re-sequencing, adjusting crew sizes, or modifying material schedules.

Advantageously, these systems and methods provide a technical solution for automating the extraction, normalization, and integration of unstructured and semi-structured data into a unified project management system. By employing advanced data processing techniques and machine learning-based optimization, the described approaches offer a structured and scalable platform for collaborative project planning, execution, and monitoring. These technical improvements eliminate inefficiencies associated with manual data handling, enable seamless coordination across multi-disciplinary projects, and enhance decision-making capabilities.

Various other functions and advantages are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 2 illustrates an example computing environment including a data modeling system in accordance with an exemplary embodiment.

DETAILED DESCRIPTION

Figure 1A:
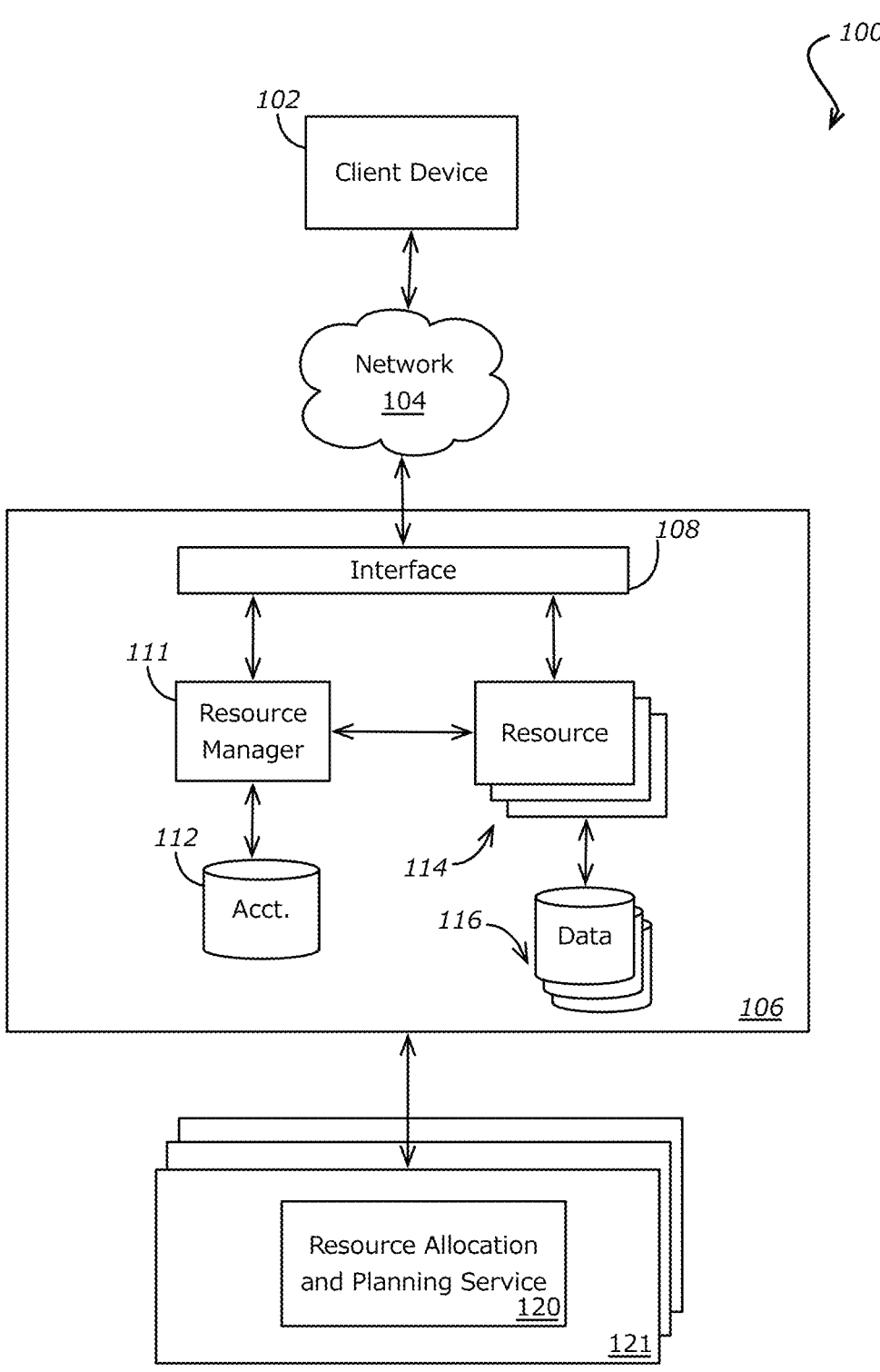
FIG. 1A illustrates an example environment in which aspects of the various embodiments of the automated multi-dimensional data processing system can be implemented.

The embodiments described herein relate to systems and methods for capturing, processing, and integrating multi-dimensional data from heterogeneous sources for optimized project planning, resource allocation, and visualization. The system is operable to automatically analyze data from sources such as 2D drawings, 3D Building Information Models (BIM), labor and material cost databases, and project specifications, utilizing data extraction, normalization, and mapping techniques to build a cohesive three-dimensional model. In various embodiments, the system can apply optimization algorithms and machine learning models to generate resource assignments, schedules, and project execution plans that are dynamically updated as new data becomes available. In certain embodiments, the system operates in a cloud-based environment, supporting remote access and multi-user collaboration, and is configured to process non-standardized data from diverse sources, transforming it into a structured format for comprehensive analysis and visualization.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1A illustrates an example environment 100 in which aspects of the various embodiments of the automated multi-dimensional data processing system can be implemented. It should be understood that reference numbers are carried over between figures for similar components for purposes of simplicity of explanation, but such usage should not be construed as a limitation on the various embodiments unless otherwise stated.

In this example, a user can utilize a client device 102 to communicate across at least one network, such as network 104, with a resource provider environment 106. The client device 102 can include any appropriate electronic device operable to send and receive requests or other such information over the network 104, and convey information back to a user of the device. Examples of such client devices include personal computers, tablet computers, smartphones, notebook computers, and the like. The user can be a person authorized to manage or interact with aspects of the resource provider environment 106, such as project managers, data analysts, or system administrators.

The network 104 may include various forms such as the Internet, cellular networks, or local area networks (LANs), enabling communication between the client device 102 and the resource provider environment 106. Communication can occur through both wired and wireless means, supporting interaction within a cloud-based infrastructure that allows for remote access to the system.

The resource provider environment 106 includes a resource allocation and planning service 120, configured to manage communication and data exchanges between different components of the system. The resource allocation and planning service 120 can ingest and process project data from multiple sources, ensuring that this data is structured and delivered to the appropriate systems for further analysis, resource allocation, and visualization. The system operates in a cloud-based environment, enabling multiple instances of the resource allocation and planning service 120 to be activated for different users or clients as needed.

In certain embodiments, the resource allocation and planning service 120 is designed to handle non-standardized data formats, converting them into a standardized format for real-time analysis and display. The resource allocation and planning service 120 interacts with various resources, such as application servers 114 and database servers 116, which manage the processing and storage of project data, including resource assignments, scheduling, and cost data.

The resource manager 111 within the resource provider environment 106 is responsible for managing user accounts and provisioning resources. It ensures that users are authenticated and authorized to access specific resources within the system. The resource manager 111 communicates with a data store 112 to retrieve account data and other relevant information, supporting secure and managed user interactions. Authentication can be implemented through multi-factor authentication or other secure methods to ensure authorized access to project data and resources.

In various embodiments, the host machine 121 is operable to host the resource allocation and planning service 120. Multiple host machines can be instantiated to accommodate different users or clients, allowing the system to scale as demand requires. The cloud-based nature of the system ensures that multiple users can access the service concurrently from various locations without experiencing processing delays or interruptions.

The interface layer 108 provides an API or other exposed interfaces that allow users to submit requests to the resource provider environment 106. These APIs enable users to manage the system, activate instances of the resource allocation and planning service 120, and interact with the system in real-time. The interface layer 108 also manages the authentication of user requests, enforcing defined access controls to ensure secure and organized system operations.

Figure 1B:
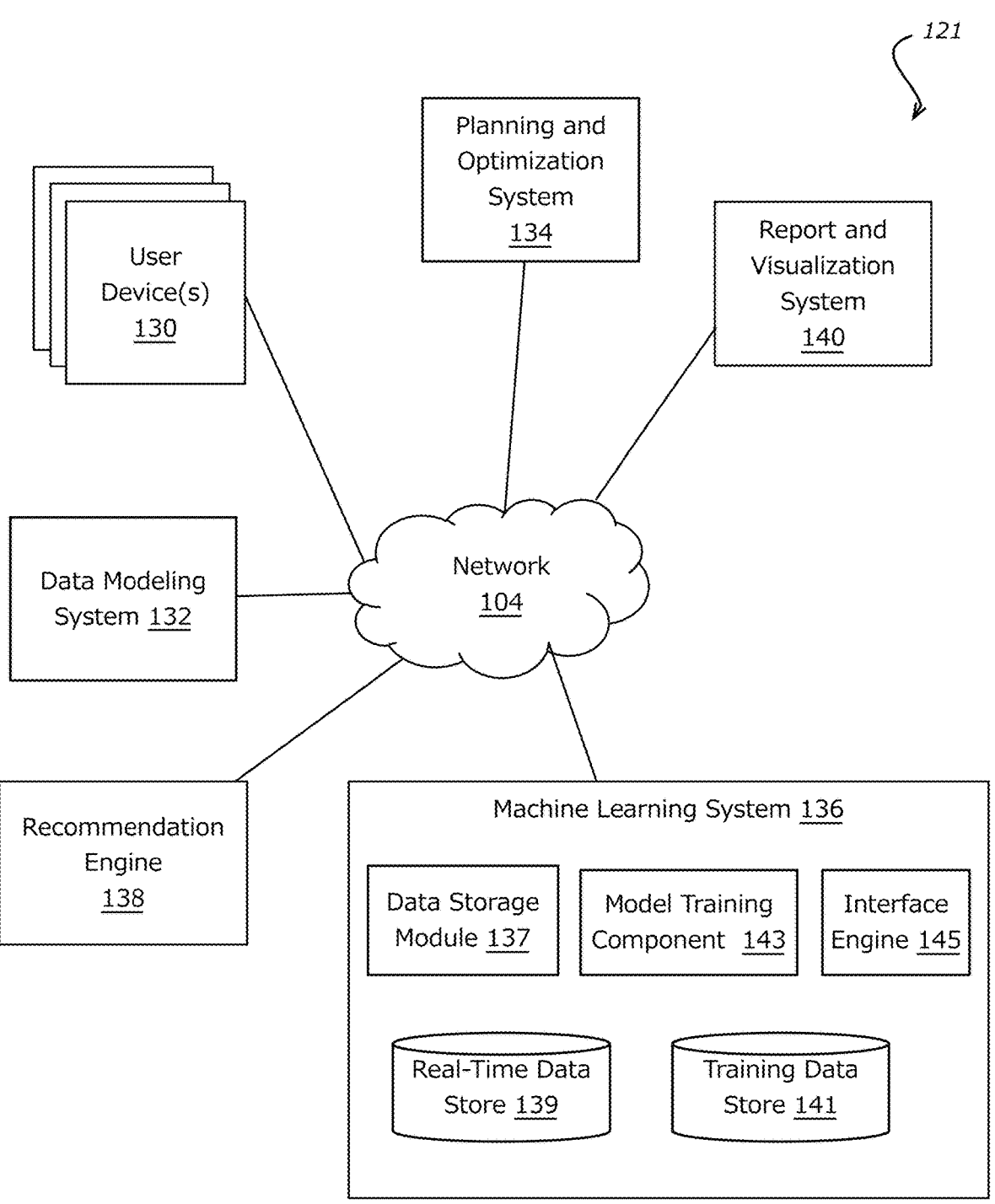
FIG. 1B illustrates the network architecture of a resource allocation and planning system in accordance with various embodiments.

FIG. 1B illustrates the network architecture of an automated multi-dimensional data processing and optimization system in accordance with various embodiments. In this embodiment, the system comprises user device(s) 130, a data modeling system 132, a planning and optimization system 134, a machine learning system 136 with a data storage module 137, model training component 143, interface engine 145, real-time data store 139, and training data store 141, a recommendation engine 138, a report and visualization system 140, and a network 104, over which the various systems and devices communicate and interact.

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Data modeling system 132 is operable to receive, integrate, and structure diverse data sources relevant to construction project planning, including but not limited to 2D drawings, 3D Building Information Models (BIM), material and labor cost databases, and project specifications. In various embodiments, data modeling system 132 employs a combination of data ingestion, mapping, and standardization components to transform unstructured and semi-structured input data into a cohesive three-dimensional schema, enabling automated project analysis and planning.

In an embodiment, data modeling system 132 includes data extraction and normalization components configured to identify and parse relevant project details from raw data inputs. These components may leverage techniques such as optical character recognition (OCR) for digitizing text-based documents, natural language processing (NLP) to interpret specifications, and semantic mapping to align project information with a standardized data model. By applying these techniques, data modeling system 132 ensures consistent formatting and accurate data representation, reducing manual input errors and enabling more precise project planning.

Data modeling system 132 can include a mapping component that links extracted data to specific zones, construction activities, and timeline phases within the project. For example, 3D BIM data may be aligned with specific geographic zones of the construction site, while cost data from material and labor databases may be tagged with corresponding activities or phases, such as excavation, framing, or finishing. This mapping allows the system to create a multi-dimensional view of the project that accurately represents both spatial and temporal relationships between different project elements.

Once processed, the structured data is stored in a project data store within data modeling system 132, where it remains accessible to other systems, such as planning and optimization system 134 and machine learning system 136, for further analysis and application. In certain embodiments, project data store supports queries across multiple dimensions (e.g., spatial zones, project phases, and resource requirements) to facilitate real-time adjustments in response to changing project conditions. The data is organized in a way that enables efficient retrieval, supporting both batch and continuous processing modes.

In various embodiments, data modeling system 132 may include a rules engine that incorporates domain-specific knowledge relevant to construction projects, such as regulatory codes, safety requirements, and resource constraints. This rules engine operates in conjunction with the mapped data to enforce project-specific guidelines and optimize resource allocation. For example, if the system detects a zoning restriction in a specific region of the project, the rules engine can flag this constraint and prevent scheduling of non-compliant activities within that zone.

Data modeling system 132 is configured to operate within a cloud-based environment, enabling integration with user device(s) 130 and facilitating access to real-time project data. This cloud-based architecture supports scalability, allowing the system to handle large datasets and provide high availability across multiple users and projects. Additionally, data modeling system 132 interfaces with other system components, such as recommendation engine 138 and report and visualization system 140, to deliver project insights and actionable data through user-friendly visualizations and reports, as will be further described in FIG. 2.

Planning and optimization system 134 is operable to generate, refine, and manage project execution plans and schedules based on the structured data provided by data modeling system 132. This system analyzes the multi-dimensional project dataset, which includes mapped relationships between spatial zones, timeline phases, and resource requirements, to create optimized project schedules, resource allocations, and workflows. Planning and optimization system 134 employs constraint-based algorithms and optimization techniques to deliver actionable project plans that dynamically adapt to real-time data updates.

In certain embodiments, the planning and optimization system 134 includes collaborative functionalities designed to manage multi-disciplinary projects with overlapping resources and dependencies. For instance, the system can enable toggling between different contractors' schedules, allowing stakeholders such as plumbers or electricians to view when other disciplines, like carpenters or HVAC installers, are scheduled in shared zones. This feature leverages dependency analysis to ensure tasks are sequenced efficiently, minimizing conflicts and downtime.

In an embodiment, the system supports collaborative toggling, enabling users to view and manage activities across multiple subcontractors. For instance, users can toggle specific subcontractor activities on or off within a shared project zone and timeline phase. This functionality provides insights into potential overlaps and interdependencies, allowing stakeholders to identify conflicts and adjust schedules dynamically. The system analyzes toggled inputs using a dependency mapping engine, which aligns tasks based on historical patterns and active project constraints.

Additionally, the planning and optimization system 134 includes mechanisms to define task dependencies dynamically. Using learning models trained on historical project data, the system identifies relationships between tasks (e.g., the need for plumbing to precede drywall installation) and incorporates these dependencies into suggested staffing and scheduling plans. If a dependency is violated—such as two tasks requiring the same zone concurrently—the system can adjust task timing or resource allocation to resolve the conflict.

The system also supports a single organization mode for monitoring and optimizing resource allocation across multiple projects within the same organization. For example, the system can dynamically reallocate personnel and equipment between projects based on priority, progress, and resource availability, ensuring optimal resource utilization across the organization. The interaction between collaborative and single organization modes allows for seamless management of interdependent projects, ensuring that staffing and progress plans remain aligned with overarching organizational goals.

In an embodiment, planning and optimization system 134 includes a scheduling engine that creates detailed task schedules by analyzing dependencies between project activities, availability of resources, and timeline constraints. For instance, the scheduling engine can prioritize tasks based on sequential dependencies, such as completing foundational work before initiating framing or wiring activities. By evaluating resource availability and geographic zones, the system ensures that each activity is scheduled in an efficient order to maximize productivity and minimize resource overlap or downtime.

Planning and optimization system 134, in various embodiments, includes a resource allocation module, which assigns specific labor, materials, and equipment to each project activity. In various embodiments, the resource allocation module operates in conjunction with data modeling system 132 to draw on real-time data regarding resource availability, costs, and usage rates. This module can dynamically adjust allocations to meet project constraints, such as cost ceilings or labor shortages, and reallocate resources when delays or changes arise, ensuring that the project remains on schedule and within budget.

For example, in an embodiment, the system operates in single organization mode to manage resource allocation across multiple projects within the same organization. In an embodiment, the system dynamically reallocates resources, such as personnel and equipment, between projects based on priority levels, real-time progress, and resource availability. For example, if a new project is introduced, the system evaluates organizational resources and adjusts staffing plans to ensure balanced utilization without exceeding constraints.

In certain embodiments, planning and optimization system 134 is operable to apply machine learning-based forecasting techniques that anticipate potential project delays, cost overruns, or resource bottlenecks. By analyzing historical data and identifying patterns in similar projects, the system can predict areas where the project might encounter issues and proactively suggest adjustments to the schedule or resource assignments. For example, if prior projects show delays during the finishing phase due to limited labor availability, the system might recommend adjustments to task sequences or the procurement of additional labor resources.

Planning and optimization system 134 can include a feedback mechanism that integrates real-time data from user device(s) 130 or other field reporting tools, allowing the system to continuously monitor project progress. As work is completed, the system updates the execution plan to reflect the current project status and adjusts future tasks accordingly. For instance, if a phase of work is completed ahead of schedule, subsequent tasks may be moved forward to capitalize on the momentum, while delays trigger reallocation of resources or adjustment of timelines.

In various embodiments, planning and optimization system 134 provides an interface for accessing and visualizing the project execution plan. This interface enables users to view schedules, resource assignments, and phase-specific task lists in a clear and accessible format. The interface also allows project managers and other stakeholders to manually adjust the plan if needed, with the system providing feedback on potential impacts of these changes on the overall project schedule and resource usage.

Planning and optimization system 134 is configured to interface with other components, such as machine learning system 136 and recommendation engine 138, to further refine project plans. In an embodiment, the system can integrate recommendations generated by machine learning system 136 to optimize task sequences or suggest resource adjustments based on predictive analytics. In an alternative embodiment, planning and optimization system 134 leverages insights from machine learning system 136 to incorporate task dependencies into project schedules. Dependencies can be dynamically managed, allowing the system to adjust schedules if conflicts arise. For instance, if two tasks requiring the same spatial zone are scheduled concurrently, the system reschedules one of the tasks or reallocates resources to resolve the conflict. Additionally, planning and optimization system 134 utilizes machine learning predictions to suggest dependency adjustments that optimize project timelines. For example, if prior projects indicate delays when tasks are sequenced in a specific order, the system proactively modifies the sequence to prevent similar issues. These adjustments are automatically integrated into the execution plan, providing real-time adaptability to project dynamics.

Machine learning system 136 can include various components configured to analyze multi-dimensional project data, predict potential project inefficiencies, and continuously improve project planning and optimization. Machine learning system 136 is operable to process data captured by data modeling system 132, analyze it using machine learning models, and provide recommendations or adjustments to planning and optimization system 134. The machine learning models applied by machine learning system 136 can identify patterns within large datasets, allowing the system to generate insights that enhance the accuracy and effectiveness of project planning, resource allocation, and timeline management.

In various embodiments, machine learning system 136 analyzes multi-dimensional project data, including data dependencies, historical project timelines, and real-time progress metrics, to dynamically adjust and optimize project plans. Machine learning system 136 incorporates data preprocessing techniques, such as normalization and semantic mapping, to ensure compatibility with its models.

In an embodiment, the system can resolve task dependencies by identifying critical path activities and resource requirements across overlapping projects. For example, if dependencies are defined between electrician and plumbing tasks, the system leverages its database to predict the optimal sequence and resource allocation based on historical patterns and real-time constraints.

In an embodiment, machine learning system 136 can resolve task dependencies by analyzing historical project timelines, resource allocations, and defined interdependencies between tasks. For instance, if a dependency exists between completing plumbing work before initiating drywall installation, the system prioritizes and sequences tasks accordingly. Using historical project data, machine learning system 136 predicts optimal resource allocation and task timing to minimize conflicts and ensure efficient project execution.

In an embodiment, machine learning system 136 can employ iterative learning algorithms to refine these dependency models. By continuously retraining its algorithms using real-time updates and historical datasets from training data store 141, the system enhances its ability to resolve resource conflicts dynamically and adjust task sequences. For example, if overlapping projects require shared resources, machine learning system 136 reallocates personnel or reschedules tasks based on current availability and predicted demand.

In an embodiment, machine learning system 136 can employ iterative learning algorithms to refine its predictions. By continuously retraining its models on incoming data captured in real-time data store 139 and training data store 141, the system enhances its ability to detect inefficiencies or predict potential delays. For instance, if a project phase requires additional staffing due to delays in another phase, machine learning system 136 suggests reallocation of resources or resequencing of tasks in collaboration with planning and optimization system 134.

To support collaborative and single-organization modes, machine learning system 136 integrates with recommendation engine 138, enabling toggling of activities and visualization of dependencies. For example, the system allows subcontractors or project managers to view overlapping schedules and adjust dependencies directly via a user interface, with the machine learning system dynamically updating plans based on user inputs and system predictions.

In certain embodiments, the system integrates collaborative and single organization modes, enabling transitions between subcontractor-level planning and organization-wide resource management. For example, dependencies defined in collaborative mode are evaluated against organizational priorities, ensuring that project-specific adjustments align with overall resource availability and scheduling requirements.

Machine learning system 136 can include a data storage module 137, which is configured to store and manage datasets required for model training and analysis. Data storage module 137 can store structured data, such as project schedules, historical data on resource usage, and prior project timelines, in formats suitable for retrieval and processing. In various embodiments, this module can index data based on project phases, resource categories, or specific project zones, enabling efficient access for training and analysis. Data storage module 137 can apply compression or partitioning techniques to manage storage needs and ensure high availability of data for processing.

Machine learning system 136 can include a model training component 143. This component is responsible for training machine learning models using historical project data stored in training data store 141. Model training component 143 utilizes various algorithms, such as regression models, decision trees, and deep learning frameworks, to analyze past project data and identify patterns in resource bottlenecks, schedule delays, and cost overruns. By learning from historical data, model training component 143 develops models that can predict similar patterns in new projects, enhancing the system's ability to proactively address potential issues. In certain embodiments, model training component 143 retrains models periodically, incorporating new data to refine predictions and maintain accuracy as project conditions evolve.

Machine learning system 136 can incorporate an interface engine 145, which facilitates communication between machine learning system 136 and other components of the network architecture, such as data modeling system 132, planning and optimization system 134, and recommendation engine 138. Interface engine 145 is responsible for formatting data outputs generated by the machine learning models and ensuring compatibility with other components' data formats. For instance, interface engine 145 can convert model outputs into actionable insights for planning and optimization system 134, enabling real-time adjustments to project schedules or resource allocations based on predictive analytics. Additionally, interface engine 145 can expose APIs to facilitate secure data transfer across the network 104, supporting the seamless integration of machine learning insights with the broader system.

Real-time data store 139 is another component of machine learning system 136, configured to store and manage data relevant to ongoing project activities. Real-time data store 139 maintains live data on current project progress, resource utilization, and timeline updates, allowing the machine learning models to incorporate real-time information into their analyses. In various embodiments, real-time data store 139 interfaces with user device(s) 130 and report and visualization system 140 to update the project execution plan based on recent inputs, such as field reports or status changes. The data stored in real-time data store 139 can be utilize for generating up-to-date recommendations, enabling the system to respond dynamically to changing project conditions.

Machine learning system 136 can leverage training data store 141, which serves as a repository for historical datasets used in model training. Training data store 141 stores anonymized data from completed projects, including resource allocation patterns, timelines, and cost metrics, which are used to develop baseline models. In some embodiments, training data store 141 organizes data according to specific project types or phases, allowing for specialized model training based on relevant parameters. This structured approach to data storage supports high-quality training, allowing the models to accurately predict potential delays or resource constraints in future projects.

In various embodiments, machine learning system 136 is operable to perform both batch and real-time data processing, adapting to the specific needs of the project. For instance, in batch mode, the system can analyze historical data stored in training data store 141, identifying long-term trends that enhance model accuracy. In real-time processing mode, the system continuously ingests data from real-time data store 139, updating predictions and recommendations based on the latest project developments. This dual processing capability ensures that machine learning system 136 can provide timely insights while also refining models based on historical data patterns.

Machine learning system 136 can analyze project data to identify areas for improvement in sequencing tasks, crew assignments, and material procurement, among others. By recognizing inefficiencies or potential delays before they manifest, the system proactively suggests adjustments to planning and optimization system 134, allowing the project team to address issues early. This continuous feedback loop enables machine learning system 136 to contribute to a data-driven optimization process, ultimately enhancing project outcomes by improving efficiency and reducing costs.

Additionally, machine learning system 136 incorporates advanced dependency modeling by analyzing historical data trends and real-time project updates. This analysis enables the system to predict how modifications to task sequences or resource allocations impact downstream activities. By applying learning mechanisms, the system continuously improves its understanding of dependencies, providing refined recommendations that minimize resource conflicts and maximize task synchronization.

Recommendation engine 138 can include components configured to generate intelligent, data-driven recommendations to support decision-making throughout various phases of project planning and execution. Recommendation engine 138 is operable to process insights derived from machine learning system 136, data aggregated from data modeling system 132, and other inputs to provide actionable guidance on optimal resource allocation, scheduling adjustments, material ordering, and task sequencing. This capability enables project teams to make informed decisions that align with real-time project needs, historical data trends, and predictive analytics.

In various embodiments, recommendation engine 138 evaluates task dependencies identified within the three-dimensional data schema. For example, the system is operable to assess task interdependencies across multi-disciplinary projects, identifying critical bottlenecks or opportunities for parallel task execution. Dependency toggling enables project managers to interactively explore alternative sequences of tasks through the system's user interface. When toggled, the engine dynamically recalculates task relationships and updates the resource plan in real-time, optimizing for overall project efficiency and adherence to constraints.

In various embodiments, recommendation engine 138 can analyze multi-dimensional data related to labor requirements, material availability, equipment usage, and project constraints to recommend resource assignments that optimize productivity and minimize delays. For example, based on data on crew productivity and historical project timelines, recommendation engine 138 may suggest reallocating labor resources to critical path activities to prevent potential bottlenecks. This recommendation process allows project managers to proactively manage resources in a manner that reduces downtime and enhances project efficiency.

Recommendation engine 138 can evaluate scheduling data and propose modifications based on real-time information. By examining ongoing project data stored in real-time data store 139, as well as predictive insights from machine learning system 136, the engine can provide alternative scheduling options if delays or disruptions are detected. For instance, if a task is projected to take longer than planned due to resource constraints, recommendation engine 138 can suggest resequencing other tasks or reallocating resources to meet project timelines. This dynamic adjustment capability enables more responsive project management by integrating real-time feedback with predictive analytics.

In an embodiment, recommendation engine 138 can include modules for material and inventory management recommendations. By analyzing data from the system's inventory and cost databases, the engine can determine optimal material ordering schedules, taking into account lead times, costs, and project demand. For example, if recommendation engine 138 identifies a trend where certain materials are prone to late delivery or cost fluctuations, it may suggest ordering those materials earlier or securing bulk orders to mitigate risk. This data-driven approach to inventory management minimizes supply chain disruptions and reduces material-related project delays.

Recommendation engine 138 can also support task sequencing optimization by analyzing interdependencies within the project's multi-dimensional model. By leveraging data from the three-dimensional schema developed by data modeling system 132, recommendation engine 138 can identify and recommend task sequences that improve workflow efficiency. For instance, if certain tasks can be performed in parallel without impacting quality or safety standards, recommendation engine 138 may suggest these adjustments to reduce project duration. This capability allows the engine to address both spatial and temporal project constraints, enhancing project flow and reducing idle time between activities.

In various embodiments, recommendation engine 138 provides actionable suggestions for resolving task dependencies based on insights from machine learning system 136. For example, the engine may suggest reordering tasks or reallocating resources to avoid conflicts between overlapping schedules. By analyzing project interdependencies within the three-dimensional data model, the engine offers recommendations that optimize resource utilization and task sequencing.

In certain embodiments, recommendation engine 138 supports toggling dependencies, enabling stakeholders to visualize and adjust task relationships interactively. For instance, project managers can define or modify dependencies directly via the user interface, and the engine updates the project plan to reflect these changes dynamically. This collaborative capability ensures that dependencies are consistently managed across all project phases.

In an embodiment, recommendation engine 138 can incorporate risk analysis capabilities, providing project managers with insights into potential risk factors associated with different project decisions. For example, by assessing historical data from training data store 141 and current project status from real-time data store 139, the engine may flag high-risk scheduling changes or resource reassignments that could lead to cost overruns or safety issues. This risk-aware recommendation feature enables project teams to weigh potential consequences before implementing adjustments, ensuring that project objectives are met with minimized risk exposure.

Recommendation engine 138 can interact with report and visualization system 140 to present recommendations in a user-friendly, visual format. This interaction enables project managers to view recommendations within the context of the project's three-dimensional data model, enhancing their understanding of how suggested adjustments impact the project timeline, resources, and budget. By providing intuitive visualizations of recommendations, the system facilitates faster and more accurate decision-making, empowering project managers to adopt data-backed strategies efficiently.

Further, report and visualization system 140 enables interactive visualization of task dependencies, resource plans, and schedule adjustments. The interface reflects real-time outputs from machine learning system 136, illustrating how changes to dependencies or project parameters affect overall timelines and resource utilization. This functionality ensures stakeholders can visually assess the impact of toggled dependencies and make informed decisions grounded in system-generated insights.

In some embodiments, recommendation engine 138 is configurable to allow project managers to set parameters or constraints that influence the types of recommendations generated. For example, project managers may set budgetary constraints, deadline flexibility, or resource limits, and recommendation engine 138 will tailor its guidance to respect these boundaries. This customizable approach ensures that recommendations align with organizational priorities and project-specific goals, making the engine adaptable to a wide range of construction project contexts.

Recommendation engine 138 contributes to a responsive and adaptive project management system by providing real-time, actionable guidance tailored to evolving project conditions. By combining data analysis, predictive modeling, and risk assessment, recommendation engine 138 enables project teams to achieve improved resource utilization, streamlined scheduling, and proactive risk mitigation, ultimately supporting more efficient and cost-effective project execution.

Report and visualization system 140 can include a series of hardware and software components operable to generate and present structured reports, visual analytics, and graphical representations of processed project data. Report and visualization system 140 is designed to integrate with other subsystems, such as data modeling system 132, planning and optimization system 134, and machine learning system 136, to offer users real-time insights into project status, resource allocations, scheduling, and other critical project metrics.

In one embodiment, the project execution plan can be generated and presented via an interactive visualization interface, allowing users to explore and adjust various project parameters dynamically. For example, report and visualization system 140 receives output data from planning and optimization system 134, which may include optimized project timelines, resource allocations, and other critical scheduling information. This data is processed into a user-friendly format, enabling users to visualize complex project elements in an intuitive manner. For example, report and visualization system 140 can render Gantt charts for project timelines, heat maps for resource allocation, and dynamic diagrams illustrating project dependencies across various activities and phases.

In various embodiments, report and visualization system 140 can integrate multi-dimensional data layers, allowing users to view project information across multiple perspectives. For instance, users may access a 3D model view displaying spatial allocations of resources within the project site, a temporal view indicating timelines and deadlines, or a cost view summarizing budgetary allocations. This multi-dimensional capability allows for a comprehensive understanding of the project from different analytical angles.

The system is operable to produce visualizations using a variety of data visualization techniques, such as bar graphs, line charts, pie charts, scatter plots, and custom visualizations tailored to specific project metrics. In certain embodiments, report and visualization system 140 may also support interactive elements, enabling users to manipulate the visualizations for further insights. For example, users can zoom into specific project phases, filter data by resource type, or adjust time scales to evaluate project progress over various periods.

In one embodiment, report and visualization system 140 is configured to support real-time updates based on continuous data input from machine learning system 136 and planning and optimization system 134. As project parameters are adjusted, the system dynamically updates the visualizations, ensuring that users have access to the most current data. This real-time functionality enhances decision-making by allowing users to respond promptly to project changes or emerging trends identified by machine learning system 136.

Report and visualization system 140 can be configured to generate automated reports, which may be periodically distributed to stakeholders. These reports can include summaries of project milestones, resource utilization, cost projections, and other relevant metrics, formatted in PDF, HTML, or other file types for easy distribution. In certain embodiments, the reports are customizable, allowing users to select specific metrics or project phases to include in the generated report, depending on the information needs of the stakeholders.

In some embodiments, report and visualization system 140 may offer augmented reality (AR) or virtual reality (VR) visualization options, where users can explore project data in an immersive 3D environment. For example, project managers could use VR headsets to walk through a virtual representation of the project site, viewing resource allocations and project milestones spatially mapped to different zones. This immersive capability can provide a unique perspective on project progress and enhance comprehension of complex data relationships.

Additionally, report and visualization system 140 may include collaboration tools, allowing multiple users to interact with the visualized data simultaneously. These tools can facilitate discussions around project changes, resource adjustments, and potential risk areas by enabling users to annotate, comment on, or highlight specific data points within the visualization. The system may log these interactions, creating a record of the collaborative decision-making process that can be referenced for future project planning.

User device(s) 130 can include, generally, any computing device that is operable to communicate over network 104. User device(s) 130 may function as a portal for inputting, accessing, and interacting with the automated multi-dimensional data processing and optimization system. Each user device 130 may collect and send data or initiate data requests to the system over the network. Suitable devices for user device(s) 130 include servers, desktop computers, laptop computers, tablets, smartphones, or other computing devices capable of data transmission.

User device(s) 130 can be electronic devices comprising hardware, software, or embedded logic components, or a combination of two or more such elements, configured to perform various functions within the system. For example, user device 130 may be a mobile phone, laptop, or tablet that enables project managers, field personnel, or other users to remotely access and interact with the system's components, such as data modeling system 132 or machine learning system 136. Through this interaction, users may input project data, review model outputs, or receive updates on project execution plans in real time.

User device(s) 130 can include applications such as web browsers—examples of which include MICROSOFT EDGE, GOOGLE CHROME, and MOZILLA FIREFOX—allowing users to access web-based interfaces by entering URLs that generate Hyper Text Transfer Protocol (HTTP) requests. These requests can be received and processed by server systems within the architecture, returning appropriate files in formats like Hyper Text Markup Language (HTML), which user device(s) 130 render as interactive web pages for the user. In other embodiments, user device(s) 130 may run dedicated applications installed locally, designed to securely interact with system components over network 104 to access real-time data feeds, execute specific commands, and display data visualization outputs within the application interface.

In various embodiments, user device(s) 130 may include desktop computers, laptops, tablets, smartphones, and other mobile devices configured to perform the functionalities described herein. The present disclosure encompasses any suitable user device(s) capable of connecting to network 104 and supporting real-time or asynchronous interactions with the system, whether through cloud-based applications or locally installed software. Depending on the implementation, user device(s) 130 may support project management personnel, site operators, and other stakeholders in accessing project data, monitoring progress, and facilitating interactions with other system components for comprehensive data management and project planning optimization.

Network 104 generally represents a network or an interconnected collection of networks over which the various components illustrated in FIG. 1B communicate. These networks may include, but are not limited to, the Internet, corporate intranets, extranets, or any combination thereof. Network 104 enables communication between user device(s) 130, data modeling system 132, planning and optimization system 134, machine learning system 136, recommendation engine 138, report and visualization system 140, and other components that support the automated multi-dimensional data processing and optimization system.

In certain embodiments, network 104 can encompass a variety of network configurations, including intranets, extranets, virtual private networks (VPNs), local area networks (LANs), wireless LANs (WLANs), wide area networks (WANs), metropolitan area networks (MANs), portions of the Internet, or combinations of two or more of these networks. Network 104 can include both wired and wireless connections, providing flexibility for components to communicate through various physical and virtual infrastructures as appropriate. For example, network 104 may include fiber optic links, Ethernet connections, Wi-Fi, cellular networks, or other networking technologies suitable for data transmission and connectivity.

One or more links connect each system, database, or engine within the system to network 104. Each link may include one or more wired, wireless, or optical connections. For example, links within network 104 can consist of Ethernet cables in a LAN configuration, fiber-optic cables in WAN infrastructure, or wireless connections for mobile user devices. The system may utilize different types of links based on the data transmission requirements, network latency considerations, and security protocols needed for specific communications. The present disclosure contemplates any suitable link or combination of links for connecting the various systems, databases, and devices described herein.

Network 104 facilitates data exchange between the systems and computing devices in the automated multi-dimensional data processing and optimization system, enabling real-time and asynchronous data processing and interactions. This network architecture supports the system's scalability by allowing the addition of new components, such as additional user devices or machine learning nodes, without requiring reconfiguration of the entire network infrastructure. The present disclosure contemplates that network 104 may be designed to support secure data transmission, including encryption protocols, authentication mechanisms, and other security measures to ensure data integrity and protect sensitive project information during transmission.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1B, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

FIG. 2 illustrates an example computing environment including a data modeling system 132 in accordance with an exemplary embodiment. In this example, data modeling system 132 can include a planning system interface 202; machine learning system interface 204; user device(s) interface 206; recommendation engine interface 208; report and visualization system interface 210; data extraction component 212; data normalization component 214 that includes data transformation module 215; mapping component 216 that includes spatial mapper 217, temporal mapper 219, and constraint mapper 221; rules engine 220; data ingestion component 218; project data store 230, material data store 232, historical project data store 234, and configuration data store 236.

Planning system interface 202 can include functionality for managing the communication and data flow between planning and optimization system 134 and other components within data modeling system 132. More specifically, planning system interface 202 is operable to receive project-related data from planning and optimization system 134, ensuring that this data is properly processed and formatted for use by other system components, such as mapping component 216 and data extraction component 212.

For example, in an embodiment, planning system interface 202 is configured to preprocess incoming data from planning and optimization system 134. This preprocessing may involve data formatting, filtering of redundant information, and preliminary validation to ensure data consistency and compatibility with downstream components. Planning system interface 202 may also apply compression algorithms, such as delta compression, to optimize data storage and transmission, particularly when handling large datasets associated with complex project plans. Once preprocessed, the data may be transmitted to project data store 230 for storage or made available for further analysis by data normalization component 214.

In various embodiments, planning system interface 202 can route preprocessed data to mapping component 216 for spatial and temporal alignment within the 3D data model. This enables the mapping component to accurately link planning data to specific project zones, phases, and activities within the multi-dimensional model. Following this alignment, the data may be further processed by rules engine 220 to apply project constraints, dependencies, and scheduling rules.

In certain embodiments, planning system interface 202 is responsible for ensuring that data flow between planning and optimization system 134 and report and visualization system 140 remains synchronized. For instance, planning system interface 202 may format and package the data to align with outputs generated by machine learning system 136 or contextual information retrieved from historical project data store 234. This ensures that all relevant information is presented cohesively, supporting accurate reporting and real-time visualization for project management.

In some embodiments, planning system interface 202 operates using various communication protocols to facilitate efficient data transmission. For instance, planning system interface 202 may use protocols such as gRPC, REST API, or other real-time communication protocols like MQTT (Message Queuing Telemetry Transport) or AMQP (Advanced Message Queuing Protocol) to transmit large-scale project data with low latency. In alternative configurations, planning system interface 202 could employ a publish-subscribe messaging pattern, enabling asynchronous data transfer between planning and optimization system 134 and data modeling system 132, which enhances scalability and fault tolerance.

In various embodiments, planning system interface 202 is responsible for ensuring the accuracy and integrity of the data it processes. To maintain data quality, the interface may apply integrity checks, version control mechanisms, or error correction algorithms to ensure that data received from planning and optimization system 134 is consistent and unaltered. This ensures that subsequent data processing, visualization, and decision-making are based on reliable and accurate information.

Machine learning system interface 204 can include functionality for managing data exchanges between machine learning system 136 and other components within data modeling system 132. Specifically, machine learning system interface 204 is operable to facilitate the transfer of processed data to and from machine learning system 136, ensuring compatibility with other components, such as data normalization component 214 and recommendation engine interface 208.

In an embodiment, machine learning system interface 204 preprocesses data destined for machine learning system 136 by applying standardization and normalization techniques. This preprocessing may involve scaling, encoding, and transformation of data to meet the requirements of various machine learning models within machine learning system 136, such as predictive models used for resource allocation or schedule optimization. Additionally, machine learning system interface 204 can perform initial data validation, ensuring that only quality-checked data is used in model training or inference.

In various embodiments, machine learning system interface 204 routes the output from machine learning system 136 to other components, such as report and visualization system 140, to provide predictive insights and recommendations in a user-accessible format. This output may include data generated by model training component 143 or predictions stored in real-time data store 139. The interface is operable to format and package these outputs in a way that aligns with downstream applications, such as visualization tools or reporting modules, ensuring that predictive insights are both actionable and understandable.

Machine learning system interface 204 may support a range of communication protocols to facilitate high-speed data transfer, including APIs and messaging protocols like HTTP, WebSocket, or binary protocols optimized for data-heavy applications such as Apache Thrift or Protocol Buffers. In some configurations, machine learning system interface 204 can employ an event-driven architecture, where processed data from data modeling system 132 is asynchronously transmitted to machine learning system 136, enabling scalability and high availability for machine learning tasks.

In certain embodiments, machine learning system interface 204 ensures data integrity and reliability through a series of validation checks. These may include version control for data schemas, checksum verifications, and redundancy elimination, thereby maintaining the accuracy of data sent to and received from machine learning system 136. This is particularly critical for maintaining the reliability of machine learning outcomes, ensuring that predictions and optimizations are based on trustworthy data.

User device(s) interface 206 can include functionality for managing the communication and data flow between user device(s) 130 and data modeling system 132. Specifically, user device(s) interface 206 enables user interactions with the system, allowing for data input, visualization, and control functions related to project planning and management. User device(s) interface 206 supports multiple types of user devices, such as desktop computers, tablets, and smartphones, each of which may connect via network 104.

In an embodiment, user device(s) interface 206 is operable to manage incoming data requests from user devices, such as project data retrieval requests, scheduling updates, or resource allocation queries. This interface can process and interpret these requests, routing them to relevant components like recommendation engine interface 208 or report and visualization system 140, where they are processed to generate the required information. For example, a user may query project progress metrics, and user device(s) interface 206 will facilitate the retrieval and transmission of these metrics from data modeling system 132 to the user's device.

In various embodiments, user device(s) interface 206 is responsible for formatting data for presentation on different user devices. This formatting can include adjusting data for optimal display on various screen sizes, applying data compression to enhance loading speeds on mobile devices, or converting data into visual formats compatible with user-facing applications on tablets or desktops. This ensures that project data, analytics, and visualizations are accessible and interpretable across diverse device types.

User device(s) interface 206 may utilize various communication protocols to facilitate reliable data transfer, including HTTP, HTTPS, WebSocket, and possibly lower-latency protocols, such as MQTT, for real-time updates. In certain configurations, user device(s) interface 206 can also support secure communication protocols, such as Transport Layer Security (TLS), to protect data integrity and confidentiality during transmission. This ensures that sensitive project data and user interactions are safeguarded during remote access sessions.

n some embodiments, user device(s) interface 206 provides authentication and authorization mechanisms to control access to data modeling system 132. These mechanisms can include multi-factor authentication (MFA), role-based access control (RBAC), and encryption techniques to secure user sessions and prevent unauthorized access to sensitive project data. By implementing these controls, user device(s) interface 206 maintains the security and privacy of data accessed via user devices.

User device(s) interface 206 can further be operable to support asynchronous data exchange, utilizing methods such as push notifications or WebSocket events to deliver real-time updates to user devices. For example, if a project schedule changes due to resource reassignment, user device(s) interface 206 can notify relevant users instantly. This real-time notification capability enables users to stay updated on project developments without the need for constant manual refreshes.

Recommendation engine interface 208 can include functionality for managing the communication and data flow between data modeling system 132 and recommendation engine 138. More specifically, recommendation engine interface 208 enables the system to deliver real-time, data-driven recommendations to users, facilitating improved decision-making in project planning, resource allocation, and scheduling. Through this interface, the recommendation engine 138 can access the necessary data, such as project timelines, resource availability, and historical project metrics, to generate tailored suggestions.

In an embodiment, recommendation engine interface 208 is operable to transmit project-specific data from data modeling system 132 to recommendation engine 138, including information on labor resources, material availability, and critical deadlines. For example, if a project is nearing a resource bottleneck, recommendation engine interface 208 facilitates the transfer of relevant data to recommendation engine 138, which then generates a recommendation, such as adjusting crew sizes or rescheduling tasks to maintain project flow.

In various embodiments, recommendation engine interface 208 supports the integration of machine learning predictions generated by machine learning system 136, allowing recommendation engine 138 to provide insights based on historical patterns and predictive analytics. For example, by accessing forecasted resource demands or potential scheduling conflicts from machine learning system 136, the recommendation engine can propose adjustments to task sequencing or resource allocation. Recommendation engine interface 208 ensures that these insights are transmitted back to the appropriate components, such as user device(s) interface 206, for display to users.

Recommendation engine interface 208 can also be configured to receive feedback on recommendations from users through user device(s) 130, which may be used to refine future suggestions. For instance, if a user accepts or rejects a recommendation regarding resource scheduling, this decision can be routed back through recommendation engine interface 208, allowing recommendation engine 138 to learn from user preferences and enhance its recommendation algorithms over time. This feedback loop supports continuous improvement of the recommendation system.

In some embodiments, recommendation engine interface 208 operates using various communication protocols to facilitate efficient data exchange. These protocols may include HTTP, REST API, and WebSocket for real-time data transmission. Additionally, recommendation engine interface 208 can apply security measures, such as TLS encryption, to protect sensitive project information and ensure secure communications between data modeling system 132 and recommendation engine 138.

In certain embodiments, recommendation engine interface 208 is operable to prioritize data transmission based on urgency. For example, if a recommendation is time-sensitive (e.g., relating to an impending deadline), recommendation engine interface 208 may prioritize its delivery over less critical updates. This prioritization ensures that users receive the most important recommendations promptly, facilitating timely adjustments to project execution.

Report and visualization system interface 210 can include functionality for managing the communication and data exchange between data modeling system 132 and report and visualization system 140. More specifically, report and visualization system interface 210 enables the structured delivery of project data, analytical insights, and real-time updates to report and visualization system 140, facilitating the generation of visual reports and dashboards for user interaction. Through this interface, users can access data visualizations that aid in tracking project progress, analyzing resource allocation, and adjusting project strategies.

In an embodiment, report and visualization system interface 210 can transmit organized project data, such as task timelines, resource usage, and cost metrics, from data modeling system 132 to report and visualization system 140. For example, when a project phase is completed or a significant milestone is reached, report and visualization system interface 210 communicates the updated data, ensuring that the visualization reflects the current project status. This transmission supports real-time reporting and allows users to make informed decisions based on up-to-date information.

In various embodiments, report and visualization system interface 210 is operable to relay data in multiple formats compatible with different visualization types, such as Gantt charts, bar graphs, and heatmaps. For instance, data related to resource allocation might be formatted for a heatmap, providing users with a visual representation of resource distribution across project zones. Report and visualization system interface 210 ensures that the data is processed and formatted for optimal display, enhancing the utility and clarity of the visualization outputs.

Report and visualization system interface 210 also facilitates the integration of predictive insights generated by machine learning system 136, enabling visual representation of forecasted outcomes and potential risks. For instance, predictive analytics concerning task delays or resource shortages are transmitted to report and visualization system 140, where they can be displayed as alerts or trend lines. This capability allows users to anticipate potential project obstacles and proactively adjust their plans.

In some embodiments, report and visualization system interface 210 is configured to manage access permissions, ensuring that only authorized users can view or interact with certain data within report and visualization system 140. For example, project managers may have access to full project analytics, while other stakeholders may be limited to viewing high-level summaries. Report and visualization system interface 210 enforces these permissions, maintaining data security while providing relevant information to each user level.

In certain configurations, report and visualization system interface 210 supports interactive data visualization, allowing users to manipulate data views in real time. For instance, a user could select a specific time range or adjust filters to view data for a particular project phase. Report and visualization system interface 210 processes these requests and retrieves the necessary data from data modeling system 132, enabling dynamic adjustments to the visualized data based on user preferences.

In various embodiments, report and visualization system interface 210 employs various data transmission protocols to ensure efficient and secure communication. These protocols may include HTTPS for secure data transfer and WebSocket for real-time updates. Additionally, report and visualization system interface 210 can utilize data compression techniques to optimize the speed and efficiency of data transfer, minimizing latency in the visualization updates.

Data extraction component 212 is operable to retrieve and extract project-related data from various heterogeneous sources, such as 2D drawings, 3D Building Information Models (BIM), material databases, and project specifications. More specifically, data extraction component 212 gathers raw data needed to populate the unified data model within data modeling system 132, allowing for subsequent processing and optimization by other system components.

In various embodiments, data extraction component 212 is operable to apply different extraction techniques based on the data source. For example, data extraction component 212 may utilize natural language processing (NLP) algorithms to identify and extract information from textual project specifications, such as material requirements, timelines, and resource allocations. When handling graphical sources like 2D drawings or 3D BIM models, data extraction component 212 may employ optical character recognition (OCR) and computer vision techniques to convert visual information into structured data suitable for further processing.

In certain embodiments, data extraction component 212 is operable to directly access external databases and systems via API connections or direct database queries. For instance, if a material database is integrated with the system, data extraction component 212 retrieves up-to-date information on materials, availability, and specifications, which may then be used in the system's resource planning processes. This capability enables the system to incorporate current data without manual updates.

Data extraction component 212 can handle various data formats, including JSON, XML, CSV, and custom file types commonly used in CAD and BIM systems. In some configurations, data extraction component 212 converts these disparate data formats into a consistent structure compatible with data normalization component 214, standardizing data representation across different sources within data modeling system 132.

In certain embodiments, data extraction component 212 is operable to manage the scheduling and prioritization of data extraction tasks based on system requirements. For example, high-priority tasks such as real-time data updates from 3D BIM models may be processed immediately, while less critical data, like historical project records, can be queued for later extraction. This scheduling capability balances system performance and ensures timely data access.

In various embodiments, data extraction component 212 includes error-handling and validation mechanisms to ensure data accuracy. For example, checksums or hash functions may verify the integrity of data received from external sources, while validation algorithms assess extracted data for completeness and logical consistency. These measures help to maintain data accuracy within data modeling system 132, supporting reliable project planning and optimization processes.

In certain configurations, data extraction component 212 is operable to collaborate with data ingestion component 218 to streamline data flow into the system. After data is extracted by data extraction component 212, it may be transferred to data ingestion component 218 for further processing and integration, ensuring an organized transition of data from external sources to the internal data model.

Data normalization component 214 is operable to standardize and format extracted data from data extraction component 212, ensuring consistency across various data sources and formats. More specifically, data normalization component 214 applies predefined schemas and normalization rules to harmonize diverse data inputs, enabling effective integration into the unified data model within data modeling system 132.

In certain embodiments, data normalization component 214 includes a data transformation module 215 that processes raw data into a structured format suitable for the system. Data transformation module 215 can perform various transformations, including unit conversions, reformatting of data fields, and alignment of data hierarchies to match the system's schema requirements. For example, if the extracted data includes measurements in different units, data transformation module 215 converts these measurements into a uniform unit system to facilitate accurate data analysis and integration.

In various embodiments, data normalization component 214 is operable to validate transformed data for consistency and accuracy before integration into the data model. For instance, data normalization component 214 may verify that all required fields are populated, and that data values fall within acceptable ranges based on predefined validation rules. This validation process minimizes the likelihood of data inconsistencies impacting subsequent analysis or planning.

Mapping component 216 is operable to assign normalized data to specific locations, timeframes, and constraints within the unified data model, supporting spatial, temporal, and logical organization of project data. More specifically, mapping component 216 includes a spatial mapper 217, temporal mapper 219, and constraint mapper 221, each responsible for a different dimension of data organization within data modeling system 132.

Spatial mapper 217 is operable to assign project data to defined spatial zones or regions within the project scope. More specifically, spatial mapper allocates project data to specific spatial zones by associating location-based attributes with designated areas within a project environment in a multi-dimensional framework, wherein location-based attributes includes at least on of building codes or material specifications. For example, spatial mapper 217 may map material quantities, labor allocations, and equipment requirements to specific areas of a construction site, enabling precise planning and resource distribution. This mapping allows the system to visualize and organize resources within a three-dimensional project space.

Temporal mapper 219 is operable to associate project data with specific timeframes, phases, or milestones. More specifically, temporal mapper organizes project tasks into sequential phases by aligning task start and end dates with a project timeline and incorporating dependencies between tasks. For instance, temporal mapper 219 aligns activities and resource requirements with corresponding project timelines, allowing for synchronized planning across various project stages. For example, temporal mapper 219 may schedule the delivery of materials or the assignment of labor to coincide with specific phases, such as foundation laying or structural framing, based on the project's overall timeline.

Constraint mapper 221 is operable to apply project-specific rules, restrictions, and dependencies to mapped data within the data model. More specifically, constraint mapper applies regulatory and safety constraints to the mapped data by enforcing compliance checks to ensure adherence to applicable standards for each spatial zone and project phase, wherein compliance checks includes at least one of maximum load limits, safety clearances, or zoning restrictions. For example, constraint mapper 221 integrates regulatory, safety, and logistical constraints that impact project execution. For instance, constraint mapper 221 may enforce restrictions on maximum allowable loads, ensure compliance with local building codes, or account for spatial limitations that affect equipment placement and usage.

In various embodiments, mapping component 216 collaborates with data normalization component 214 to ensure that the mapped data adheres to the standardized format required by data modeling system 132. Mapping component 216 can dynamically adjust mappings based on real-time updates or changes in project requirements, enabling adaptive planning and execution within the system.

In certain configurations, mapping component 216 may include mechanisms for conflict resolution when data constraints overlap or conflict. For example, if multiple resources are allocated to the same spatial zone or timeframe, constraint mapper 221 may adjust allocations or provide recommendations for resource reallocation, supporting efficient project management.

Rules engine 220 is operable to apply domain-specific logic and rules to the data processed within data modeling system 132, guiding decision-making and ensuring compliance with project-specific requirements. More specifically, rules engine 220 enforces constraints, policies, and standards that govern various aspects of project planning, resource allocation, and scheduling.

In certain embodiments, rules engine 220 is configured to reference predefined rule sets stored in configuration data store 236, which may include regulatory standards, safety guidelines, material handling requirements, and operational protocols specific to the project or industry. For example, rules engine 220 may enforce building codes related to structural stability, fire safety regulations, or environmental compliance standards.

In various embodiments, rules engine 220 collaborates with other components, such as constraint mapper 221 within mapping component 216, to ensure that mapped data adheres to the defined rules and constraints. For instance, rules engine 220 may validate that resource allocations comply with weight limits for construction zones or verify that scheduled tasks meet mandated safety protocols.

Rules engine 220 can also support conditional logic to adapt project plans based on real-time data updates. For example, if a scheduling conflict arises due to delays in material delivery, rules engine 220 may automatically adjust subsequent tasks or propose alternative resource allocations that align with the project's timelines and resource availability. This capability enables adaptive planning and supports seamless project execution under changing conditions.

In some embodiments, rules engine 220 is operable to incorporate machine learning insights provided by machine learning system 136, enhancing its rule-based logic with data-driven recommendations. For instance, if machine learning system 136 identifies a pattern suggesting that a particular sequence of tasks consistently results in delays, rules engine 220 may adjust scheduling rules to optimize task order and improve project efficiency.

In alternative configurations, rules engine 220 may support customized rule sets tailored to specific client or project needs. Users can define custom rules to reflect unique requirements or preferences, and rules engine 220 will incorporate these rules into its decision-making processes. For example, a client may require that certain materials are prioritized based on availability or that particular tasks are executed only during specific hours due to environmental restrictions.

Rules engine 220 further interacts with data extraction component 212 and data normalization component 214 to ensure that all processed data aligns with the established rules before integration into the data model. This comprehensive rule application process minimizes inconsistencies and enhances the reliability of the project data framework within data modeling system 132.

Data ingestion component 218 is operable to import data from various external and internal sources into data modeling system 132, facilitating the initial step of data processing within the system. More specifically, data ingestion component 218 obtains unstructured project-related data from various heterogeneous sources, such as material databases, project management tools, cost estimation systems, and user inputs, and prepares this data for subsequent processing by components within data modeling system 132.

In certain embodiments, data ingestion component 218 is configured to handle both structured and unstructured data formats. For example, it can ingest data in the form of CSV files, XML, JSON, or other standardized formats, as well as parse data from unstructured sources, such as PDFs or scanned documents, using techniques such as optical character recognition (OCR) and natural language processing (NLP). This flexibility allows data ingestion component 218 to accommodate a wide range of data sources, ensuring comprehensive data integration for project planning and execution.

In various embodiments, data ingestion component 218 includes data validation protocols to verify the accuracy and integrity of incoming data. For instance, it may perform checks to confirm that all required data fields are populated, that data values fall within acceptable ranges, and that timestamps or identifiers are consistent. If inconsistencies or errors are detected, data ingestion component 218 can flag these for further review or automatically correct them based on predefined rules in collaboration with rules engine 220.

Data ingestion component 218 also interacts with data extraction component 212 to identify relevant data fields for extraction from complex, multi-format datasets. For example, when importing data from a large construction database, data ingestion component 218 may identify key parameters such as material quantities, labor rates, and timelines, which data extraction component 212 will subsequently process for integration into the 3D data model.

In some embodiments, data ingestion component 218 works in conjunction with data normalization component 214 to transform and standardize the ingested data, ensuring compatibility with the system's schema. This ensures that all incoming data is prepared and formatted consistently for mapping and storage, eliminating variability that may affect downstream processes within data modeling system 132.

In alternative configurations, data ingestion component 218 may operate on a scheduled basis, periodically ingesting updates from external data sources to keep project plans current. This capability supports dynamic project management by enabling regular data refreshes, which can inform real-time adjustments to resource allocation, scheduling, and project execution.

Data ingestion component 218 is also operable to manage data storage protocols for interim data. In certain embodiments, data ingestion component 218 temporarily stores data in a buffer or cache before transmitting it to project data store 230 or other relevant datastores. This storage method helps to streamline data handling and reduces the likelihood of processing delays, particularly when handling large datasets.

Project data store 230 is operable to store data specific to the ongoing construction projects being processed within data modeling system 132. More specifically, project data store 230 retains information such as project blueprints, zoning details, construction phases, assigned tasks, and associated resources for each project instance. This repository provides a structured storage environment for project-specific datasets, ensuring that data modeling system 132 can access and reference these details as required for scheduling, resource allocation, and planning activities.

In an embodiment, project data store 230 organizes data by project identifier, enabling efficient retrieval of project-specific data and facilitating updates as project plans evolve. For example, as new data is ingested or updated within the system, such as revised task allocations or modified timelines, project data store 230 can dynamically update these records, ensuring the latest information is available for all components of data modeling system 132.

Material data store 232 is operable to manage information related to construction materials, including types, specifications, quantities, and availability. Material data store 232 serves as a centralized repository for data on materials required for each project, allowing data modeling system 132 to access relevant details for resource planning and inventory management. For instance, material data store 232 may include specifications for concrete grades, steel dimensions, wood types, and other construction materials, enabling the system to accurately plan for material requirements and allocation.

In certain embodiments, material data store 232 interacts with rules engine 220 to apply constraints on material usage and availability. For example, if a material exceeds project requirements or violates spatial constraints defined by rules engine 220, material data store 232 can alert the system to potential conflicts, ensuring that only permissible quantities are allocated for a given project.

Historical project data store 234 is operable to archive data from past projects, providing a reference dataset for analysis and machine learning model training. More specifically, historical project data store 234 retains project data, resource allocations, timelines, and task completions from completed projects. By referencing this historical data, machine learning system 136 can identify patterns, optimize future project planning, and improve forecasting capabilities. For example, historical project data store 234 can enable machine learning system 136 to analyze past delays or resource bottlenecks, enhancing its ability to predict similar issues in ongoing projects.

In various embodiments, historical project data store 234 stores data in a structured format that supports data extraction and model training processes. This structured archival allows machine learning system 136 to readily access relevant historical data, aiding in the development of predictive models and decision-making tools that enhance planning and optimization system 134.

Configuration data store 236 is operable to store system configuration settings, including rules, constraints, and user-defined preferences that guide data modeling system 132. Configuration data store 236 acts as a repository for adjustable parameters that influence the processing and management of project data. For example, configuration data store 236 may store rules for spatial constraints, scheduling preferences, or material handling limitations, which are referenced by rules engine 220 to enforce project compliance.

In certain embodiments, configuration data store 236 allows users to modify system settings according to specific project needs, providing flexibility in the application of rules and constraints. For instance, if a project requires unique spatial allocations or resource allocations, configuration data store 236 can retain these preferences, allowing data modeling system 132 to customize its processing for that particular project.

In alternative embodiments, configuration data store 236 interacts with other data stores, such as material data store 232 and project data store 230, to dynamically adjust system behavior based on stored configurations. This interaction enables data modeling system 132 to align its operations with customized settings, ensuring that project data is processed in accordance with defined project specifications and operational requirements.

Figure 3:
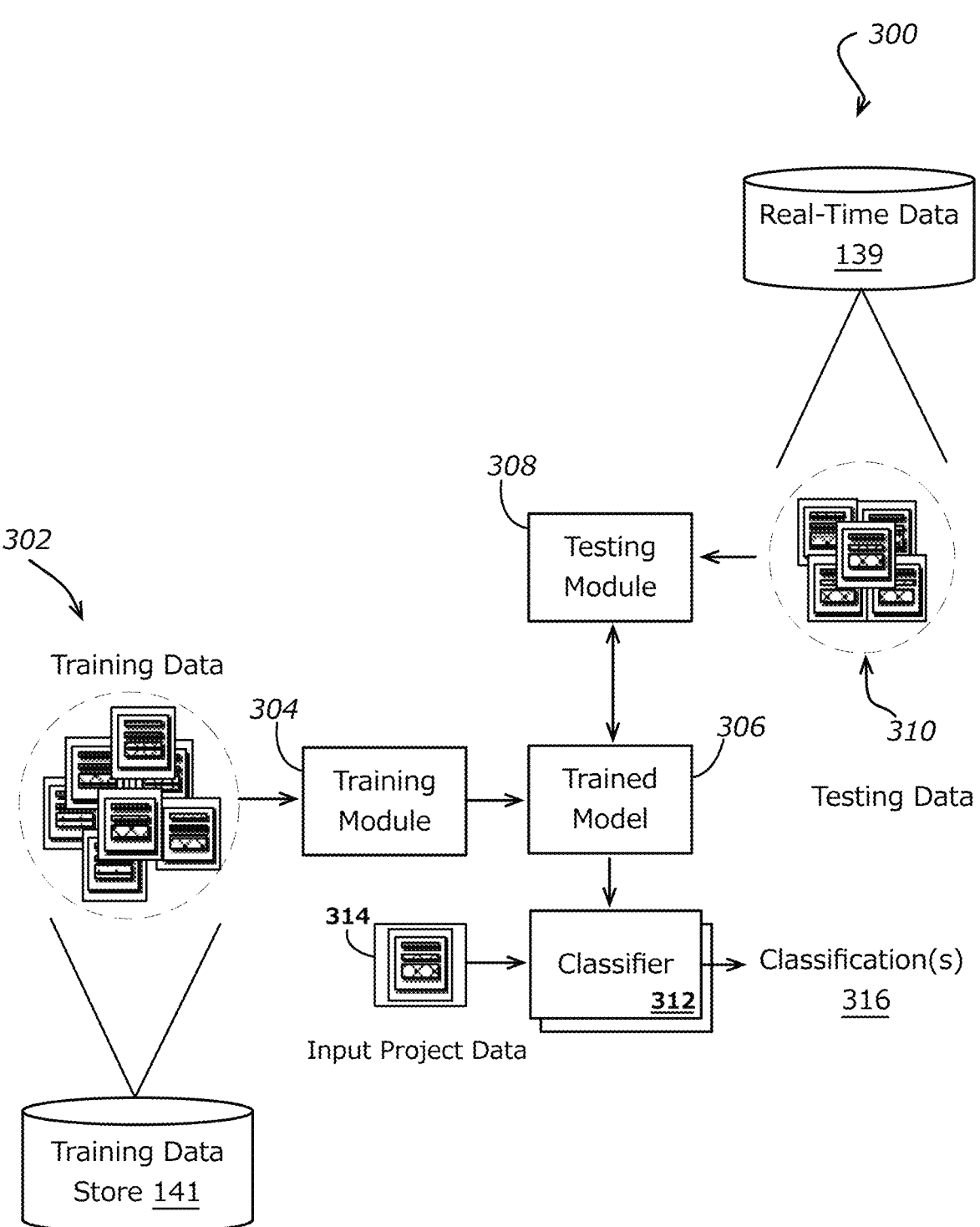
FIG. 3 illustrates an example classification pipeline of a machine learning system that can be utilized in accordance with various embodiments.

FIG. 3 illustrates an example classification pipeline 300 for processing and classifying project data in accordance with various embodiments. In this example, a set of input project data 302 is collected from relevant data sources and processed to train one or more machine learning models or neural networks 306. These models are configured to classify various project-related parameters, constraints, or resource requirements, essential for creating optimized project execution plans.

In various embodiments, input project data 302 can include a combination of structured and unstructured data, such as project specifications, 2D drawings, 3D models, cost estimates, labor productivity rates, and historical project records. This data is used as training data to develop machine learning models, including algorithms capable of analyzing and classifying the input data for improved project planning and optimization. The project data can be collected from a range of sources, such as project databases, on-site inputs, and historical archives The training data 302 is annotated with labels that define specific classifications, such as material requirements, workforce assignments, and scheduling constraints. This labeled data serves as a foundation for training the machine learning model 306 to recognize patterns and dependencies within project data. For instance, training data could include labeled segments representing specific tasks or project zones, allowing machine learning model 306 to learn correlations between project requirements and constraints.

Once the training data has been processed, it is directed to a training module 304. The training module 304 is responsible for training machine learning model 306 using supervised learning techniques, wherein the model learns to associate input features with specific classifications. For example, training module 304 may train machine learning model 306 to detect and classify resource bottlenecks, potential delays, or cost overruns based on historical project data.

In certain embodiments, training data 302 is divided into training and testing subsets. The testing module 308 uses a separate set of testing data 310 to evaluate the performance of the trained model. The testing data 310 includes previously unseen project data, which machine learning model 306 has not been exposed to during training. By comparing the model's classifications to actual project data, the system can assess the model's accuracy and refine its parameters as necessary.

If the testing results meet accuracy thresholds, machine learning model 306 is deployed into the classification pipeline as classifier 312. Classifier 312 is configured to analyze new input project data 314 and generate classifications 316 in real-time or as needed for project planning. These classifications may include workforce assignments, material allocation, and task sequencing based on project constraints.

In various embodiments, classifier 312 may generate multiple classifications based on different project zones or tasks, enabling tailored resource allocation and scheduling. For example, the system may classify one project phase as having a high demand for specific resources while another phase is flagged for potential delays. Classifier 312 continuously updates its models with new project data, thereby enhancing its classification accuracy over time.

Classification pipeline 300 is operable to integrate input data from multiple sources, such as scheduling databases, inventory management systems, and on-site monitoring devices. The system leverages deep learning techniques, such as neural networks, to provide accurate and timely classifications relevant to project planning and optimization.

In alternative embodiments, classification pipeline 300 could support unsupervised learning techniques, such as clustering, to group similar project components without labeled data. This approach could assist in identifying patterns across projects, further enhancing the system's predictive capabilities.

Classification pipeline 300 can be utilized across various project management scenarios, allowing for dynamic analysis and optimization of project workflows based on diverse data types. Additionally, this system supports continuous learning, where new project data further refines and improves the accuracy of the model over time.

Figure 4:
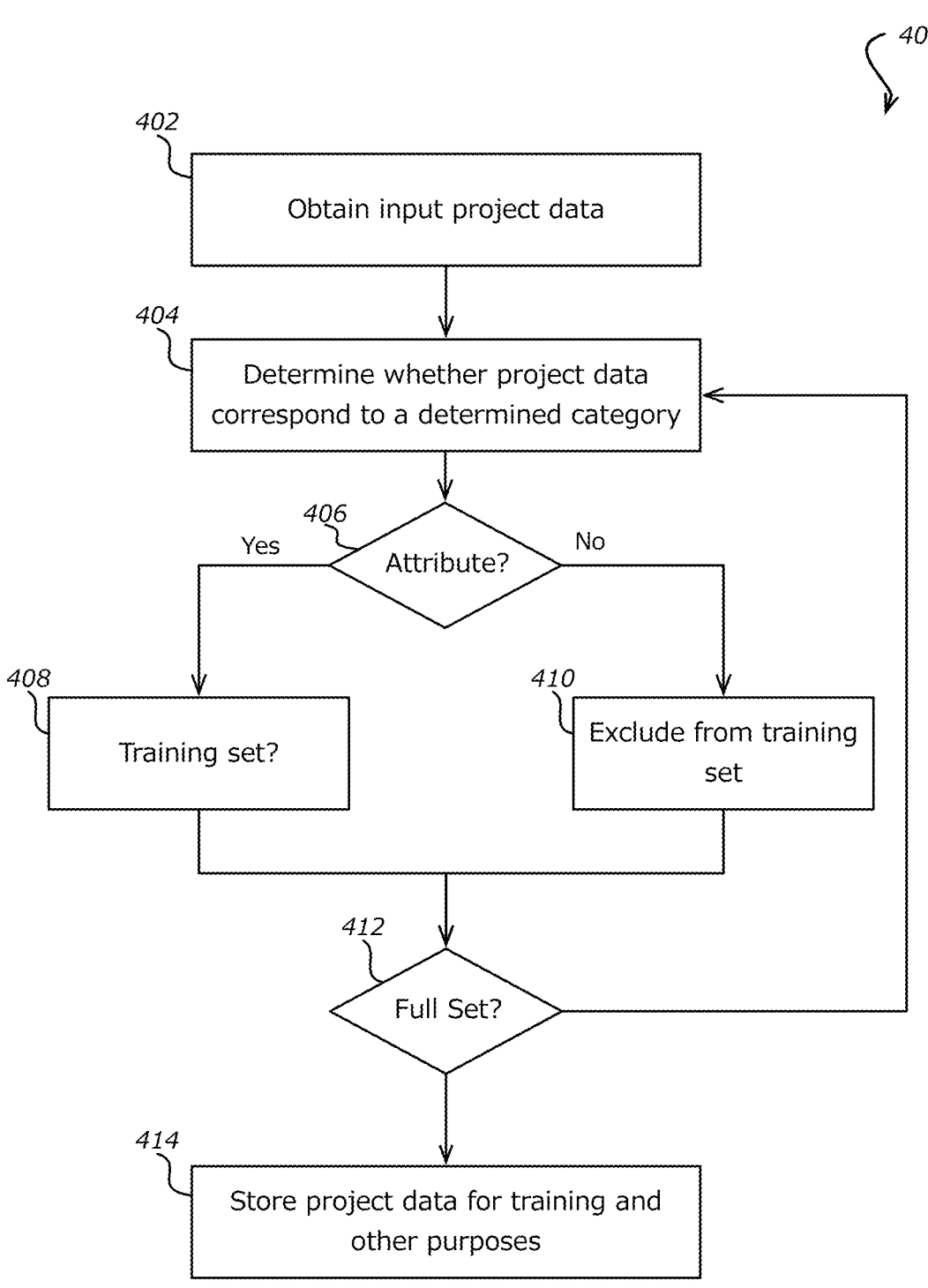
FIG. 4 illustrates an example process for determining training data that can be utilized in accordance with various embodiments.

FIG. 4 illustrates an example process 400 for determining training data that can be utilized in accordance with various embodiments. In this example, a set of input data is obtained at step 402 for analysis. This data can be gathered from sources such as data modeling system 132, historical project records, or external databases. In certain embodiments, the input data may include 2D drawings, 3D Building Information Models (BIM), project specifications, or cost estimates related to construction project planning.

For at least some of the data, such as a randomly selected subset or other determined samples, information associated with the data can be analyzed at step 404 to determine whether the input data corresponds to a defined category or contains specific attributes necessary for training machine learning models, such as those used by machine learning system 136. This may include categories or attributes associated with structural parameters, material costs, or project scheduling components.

If it is determined at step 406 that the input data exhibits the relevant attribute for a particular category, then that data can be added to the training set at step 408. For instance, if the system identifies data as containing structural configurations for a particular building type, it can be tagged and incorporated into the dataset used to train models related to structural planning. If the data does not exhibit the required attributes, it can be excluded from the training set at step 410.

At step 412, a check is made to determine whether a complete training set has been assembled. Criteria for a complete set may include reaching a predefined number of data samples or achieving diversity in the types of project parameters represented. If the training set is complete, the input data can be stored at step 414 for training purposes, where it can be used to enhance the accuracy of models within the system, such as those used by machine learning system 136. Otherwise, the process continues until a full set is assembled, or until all relevant input data is analyzed or another stop condition is reached.

Figure 5:
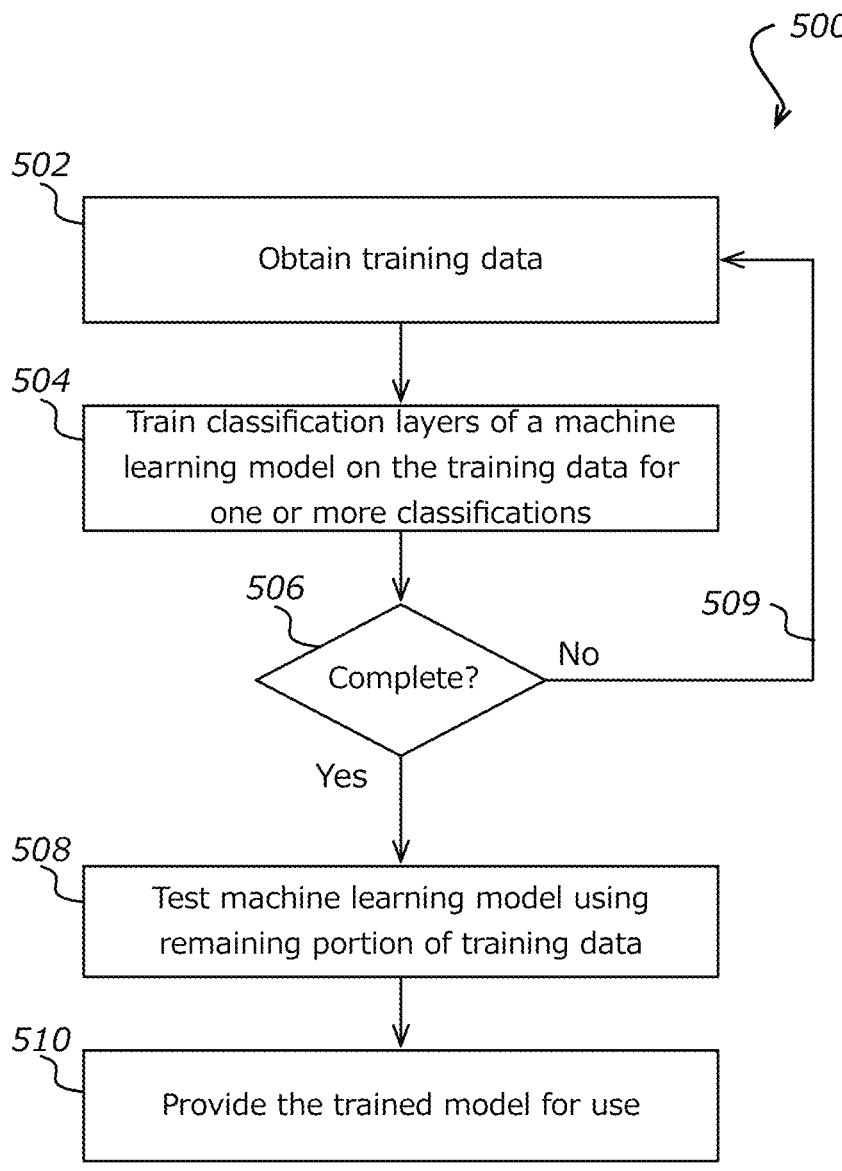
FIG. 5 illustrates an example process for training a model that can be utilized in accordance with various embodiments.

FIG. 5 illustrates an example process 500 for training a machine learning model 306 in accordance with various embodiments. The process begins at step 502, where the system obtains a set of training data, which may include structured project data, historical data, and labeled datasets representing classifications relevant to project planning. For example, the training data could encompass labeled project phases, resource requirements, task sequences, and associated dependencies, allowing the model to recognize patterns in resource allocation, task prioritization, and project sequencing.

At step 504, the system trains the classification layers of the machine learning model on this training data. During this phase, the model adjusts its internal parameters (e.g., weights of a neural network) to improve its ability to recognize specific project-related features and classifications essential for planning and optimization. For instance, the model might learn to classify tasks by resource intensity or dependencies, helping it recognize, for example, that foundation work must precede structural assembly. In one embodiment, the model may use logistic regression or other machine learning techniques to distinguish between high-priority tasks and ancillary tasks, thereby aiding in resource prioritization.

At decision point 506, the system determines if a stop condition has been met. This condition might involve completing the entire training dataset or reaching a specified accuracy threshold. If the stop condition is met, the process moves forward; otherwise, it loops back 509 to step 502 to continue training, allowing the model to iteratively refine its parameters based on newly incorporated data until the performance criteria are satisfied.

After training, the model undergoes a testing phase at step 508, where it evaluates its performance using a reserved portion of the data not included in the initial training. This testing phase assesses the model's accuracy and predictive capabilities in classifying project components and optimizing sequences. For instance, the model might analyze a test subset of project data, generating predictions for task duration or identifying resource conflicts, which are then compared against actual classifications in the test data to validate accuracy.

If the model's performance meets predefined accuracy thresholds during testing, the system proceeds to step 510, deploying the trained model for use in real-world project classifications and optimization tasks. For example, a trained model might apply its learned associations to classify new project data, such as scheduling sequences and resource dependencies, thereby supporting dynamic adjustments and predictive insights in live project environments. If the performance falls short of the required accuracy, additional refinements may be applied to the model's parameters based on observed discrepancies, such as misclassified tasks or resource prediction errors.

This cycle of training, testing, and iterative improvement continues until the machine learning model achieves the required accuracy and reliability. Upon reaching this stage, the fully trained model is integrated into the system, allowing it to assist with real-time project planning, data analysis, and optimization. This integration enhances the system's ability to dynamically allocate resources, optimize schedules, and adapt to project changes, contributing to more efficient project execution.

Figure 6:
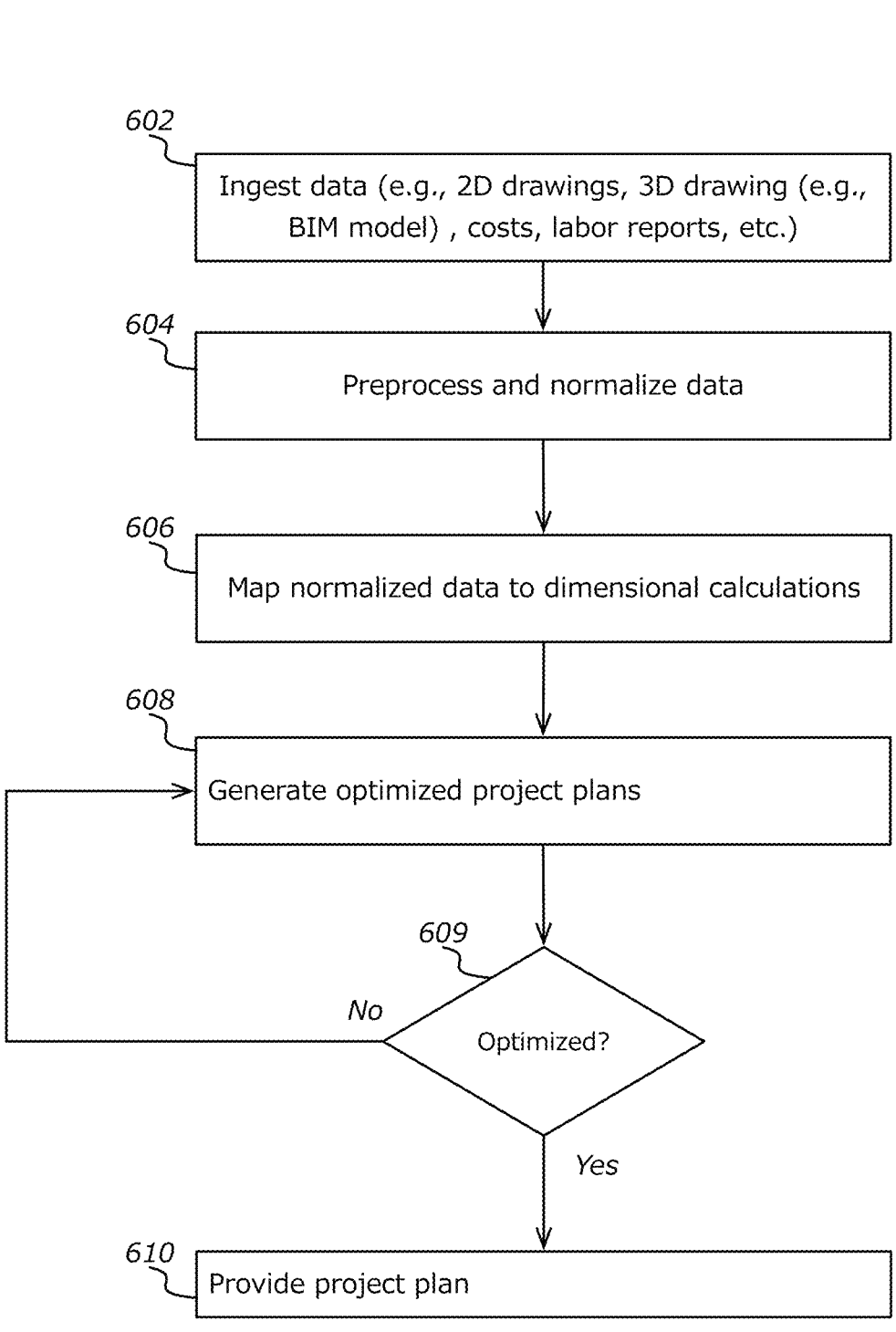
FIG. 6 illustrates an example data flow through the system, showing how raw data is ingested, processed, and transformed into optimized project plans and visualizations.

FIG. 6 illustrates an exemplary process 600 for ingesting, processing, and mapping project data within a multi-dimensional data processing and optimization system in accordance with various embodiments. The steps in this process may be performed by components within the system as shown in FIG. 1B, FIG. 2, and FIG. 3, or in association with similar systems and components. The process may include additional steps, fewer steps, and/or a different sequence of steps without departing from the scope of the invention as would be apparent to one of ordinary skill in the art.

At step 602, project-related data is ingested into the system. This raw data can include 2D construction drawings, 3D Building Information Models (BIM), labor reports, cost estimates, and other documents or files relevant to construction planning. The BIM model, in this context, represents traditional three-dimensional structural information about the building, such as geometry, spatial relationships, and material properties. In an embodiment, the data ingestion component 218 gathers this data from various sources, ensuring a comprehensive collection of project information.

At step 604, the system normalizes the ingested data to achieve consistency and standardization across data sources. More specifically, upon receiving project-related data, the system normalizes this unstructured data within a unified schema, generating normalized data that can be efficiently processed by subsequent components. For example, the data normalization component 214, with the support of data transformation module 215, formats and standardizes the data into a unified schema compatible with other system components. This normalization process may include converting different units of measurement, aligning data formats, and applying transformation rules to make the data interoperable within the system. For example, suppose the ingested data includes material specifications from different sources, with some sources listing material quantities in metric units (e.g., kilograms, meters) while others use imperial units (e.g., pounds, feet). The data normalization component 214 converts all units to a common standard, such as metric, to ensure compatibility across system processes. Additionally, some sources may list project timelines in days, while others use weeks or specific calendar dates. The data transformation module 215 converts these varying formats into a standardized timeline format, such as setting all durations in days from the project start date, which simplifies scheduling and sequencing across the project phases. Further, if data is ingested from multiple vendors, each may use different terminology for similar materials—for instance, "rebar" vs. "reinforcement bar" or "steel beam" vs. "structural beam." The data normalization component applies a transformation rule to map these variations to a single standardized term, such as "reinforcement bar" and "structural beam," ensuring consistent terminology throughout the system. This standardized data schema allows the system to handle diverse data inputs from various sources seamlessly, enabling integrated processing and analysis.

At step 606, the normalized data is mapped to a dimensional calculations model within a three-dimensional framework. More specifically, the normalized data is mapped to a dimensional calculations model, which organizes and structures the data across various parameters, facilitating multi-dimensional analysis.

In an embodiment, the dimensional calculations model processes unstructured data inputs, such as tender bid documents, without relying on structured BIM data or 3D models. Unlike systems that depend heavily on pre-defined BIM inputs, this model normalizes and aligns unstructured inputs into spatial, temporal, and regulatory frameworks, enabling the creation of actionable project plans without predefined structured data.

In an embodiment, this model, referred to as dimensional calculations rather than a traditional 3D model, represents a broader concept that includes not only the spatial layout but also temporal scheduling and project-specific constraints. More specifically, "dimensional calculations" refer to a structured approach for organizing and analyzing project data across multiple dimensions-spatial zones, temporal phases, and project-specific constraints providing a broader scope than traditional 3D models, which primarily represent physical structures. Simply put, the dimensional calculations model integrates spatial, temporal, and regulatory parameters, aligning the data across spatial zones, temporal phases, and operational constraints to provide a cohesive project framework.

For example, mapping component 216 employs spatial mapper 217, temporal mapper 219, and constraint mapper

221 to link the normalized data to spatial zones, project phases, and regulatory constraints. For instance, spatial mapper 217 may allocate specific building materials, such as steel beams or concrete sections, to designated zones in the construction plan. Temporal mapper 219 associates activities, like concrete pouring or electrical installation, with specific project phases on the timeline. Constraint mapper 221 integrates regulatory requirements or safety guidelines, such as load-bearing limits or fire safety zones, into the mapped data, ensuring compliance with relevant standards. This mapping process builds a structured representation of the project, associating resources, activities, and schedules within a multi-dimensional framework for integrated planning.

In some embodiments, the optimization algorithms dynamically resolve task dependencies identified during conflict detection. For example, if overlapping resource demands are detected between dependent tasks, the system recalculates task schedules and reallocates resources to balance workloads while maintaining project constraints. This dynamic adjustment capability ensures that dependencies are resolved without manual intervention, improving project flow and reducing delays.

In an embodiment, after detecting scheduling conflicts, the dimensional calculations model employs optimization algorithms to resolve these conflicts by adjusting task sequences, reassigning resources, or modifying temporal allocations across spatial zones and project phases. For instance, if a conflict is detected between two tasks scheduled simultaneously in the same spatial zone, such as electrical installation and drywall assembly, which cannot proceed in parallel due to space or safety constraints, the system can adjust the sequence to resolve this issue. In one example, the system might prioritize electrical installation and delay the drywall assembly until completion, minimizing downtime and adhering to safety guidelines.

After detecting scheduling conflicts, the dimensional calculations model employs optimization algorithms to resolve these conflicts by adjusting task sequences, reassigning resources, or modifying temporal allocations across spatial zones and project phases. For instance, if a conflict is detected between two tasks scheduled simultaneously in the same spatial zone, such as electrical installation and drywall assembly, which cannot proceed in parallel due to space or safety constraints, the system can adjust the sequence to resolve this issue. In one example, the system might prioritize electrical installation and delay the drywall assembly until completion, minimizing downtime and adhering to safety guidelines.

At step 608, the mapped data is used to generate an optimized project plan. For specifically, based on the mapped data, the system generates computationally optimized sequences to support effective project coordination, ensuring efficiency in resource allocation and task scheduling. For example, planning and optimization system 134 analyzes interdependencies and constraints within the mapped data, applying optimization algorithms to determine efficient task sequences, resource allocations, and scheduling arrangements. For example, the system may optimize labor scheduling by aligning specialized tasks, such as electrical wiring or HVAC installation, with the availability of skilled personnel. Similarly, equipment like cranes or scaffolding may be scheduled in a way that maximizes utility across multiple phases. The result is an optimized project execution plan that addresses task sequencing, resource constraints, and scheduling requirements.

At step 609, a decision point is reached to evaluate whether the generated project plan satisfies predefined optimization criteria. These criteria may include adherence to budget limits, minimized resource conflicts, or compliance with timeline constraints. If the plan meets the necessary criteria (following the "Yes" path), it proceeds to step 610, where it is finalized and made accessible to users through the report and visualization system 140. In an embodiment, the project execution plan can be generated and presented via an interactive visualization interface, allowing users to explore and adjust various project parameters dynamically.

However, if the plan fails to meet optimization standards (following the "No" path), adjustments may be made by returning to a previous step, allowing the system to incorporate new parameters or refine existing data. More specifically, the system iteratively refines the project execution plan by optimizing performance metrics, such as project duration and resource utilization, to enhance project efficiency. In certain embodiments, at least one performance metric includes multiple sub-metrics. This iterative process ensures that the project plan is optimized to enhance efficiency and effectiveness prior to finalization.

Figure 7:
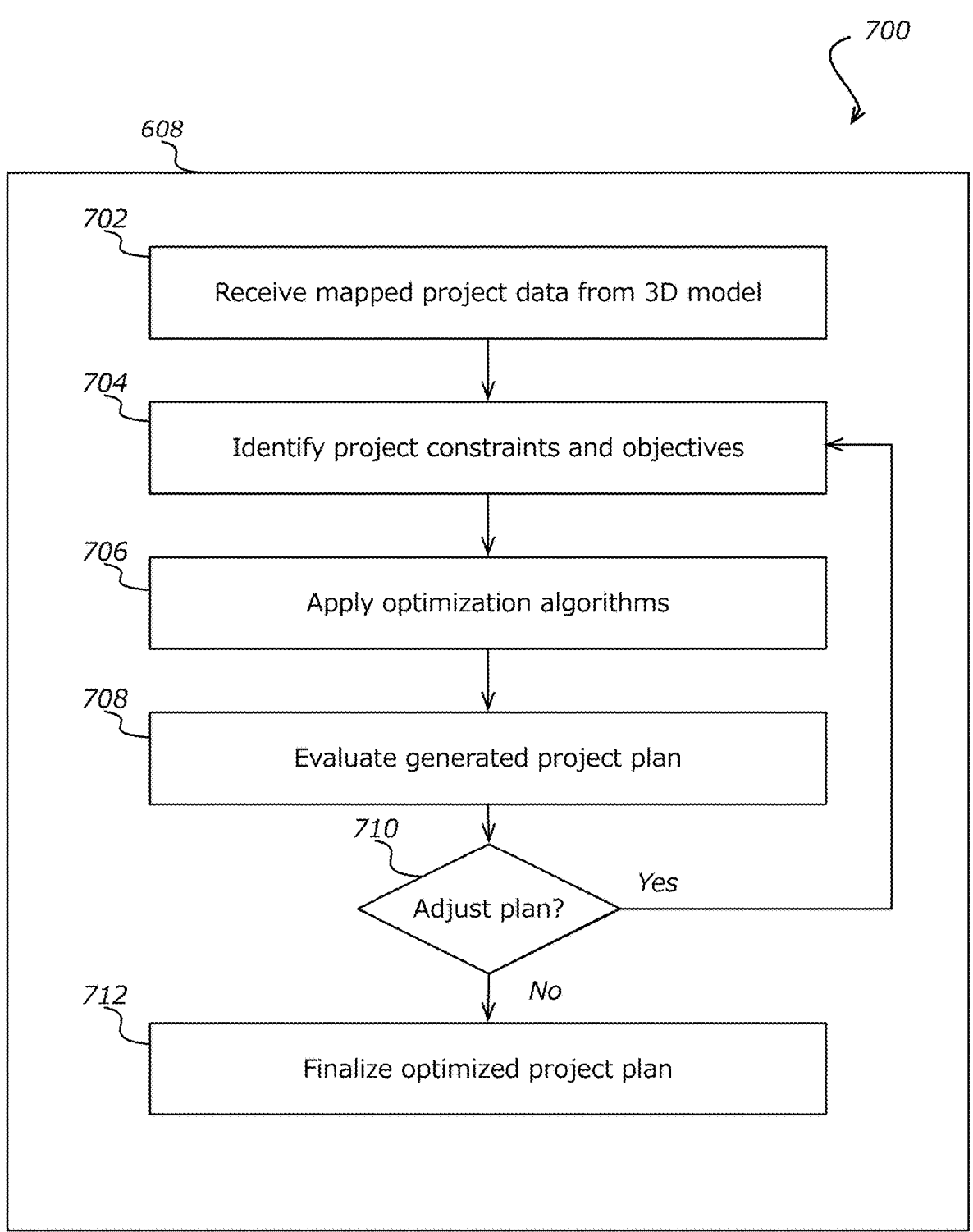
FIG. 7 illustrates an example process for optimizing project execution in accordance with various embodiments.

FIG. 7 illustrates an exemplary process 700 for generating optimized project plans, corresponding to step 608 in FIG. 6, within a multi-dimensional data processing and optimization system in accordance with various embodiments. More specifically, the system iteratively refines the project execution plan by optimizing performance metrics, such as project duration and resource utilization, to enhance project efficiency. The process steps may be performed by components of the system, as described in FIG. 1B, FIG. 2, and FIG. 3, or in association with similar systems and components. The process may include additional steps, fewer steps, and/or a different order of steps, without departing from the scope of the invention, as would be apparent to one of ordinary skill in the art.

At step 702, the system receives mapped project data from the dimensional calculations generated in previous processes. This mapped data includes spatially and temporally organized project information, such as construction zones, material requirements, task sequences, and regulatory constraints. As described herein, "dimensional calculations" can refer to a structured method for organizing and analyzing project data across multiple dimensions, including spatial zones, temporal phases, and project-specific constraints. Unlike conventional 3D models that primarily represent physical structures, these dimensional calculations are configured to address the scheduling, resource allocation, and regulatory constraints integral to structural planning and resource scheduling. The data modeling system 132 ensures that the project data is consistently formatted and structured, enabling efficient processing in downstream steps. In an embodiment, the mapped project data incorporates location-specific attributes, such as building code requirements for each zone, and timeline-specific details, like activity start and end dates, which are essential for accurate project planning.

At step 704, the system identifies project constraints and objectives. In an embodiment, this can include assessing parameters such as budget limits, resource availability, safety requirements, and timelines, which influence the overall feasibility and execution of the project. The constraints may also include interdependencies between project activities, such as the need to complete foundational work before starting structural assembly. In certain embodiments, the system retrieves historical data from past projects to inform these constraints, enabling the system to anticipate potential bottlenecks or resource conflicts based on similar projects. For example, if historical data indicates that certain tasks require specialized labor that is limited in availability, the system may schedule these tasks during periods when such labor is more accessible, thus optimizing labor utilization and minimizing project delays.

At step 706, the system applies optimization algorithms to analyze the dimensional calculations and identified constraints. The system can select an optimization goal based on project-specific requirements or user-defined priorities. For instance, if a project has a strict deadline, minimizing project duration may be selected as the primary performance metric. Alternatively, if the project faces limited availability of skilled workers or high-demand equipment, resource utilization may be prioritized to ensure efficient use of personnel and machinery. In another scenario, if the project operates in a highly regulated environment, compliance adherence might be the primary focus, with the system ensuring all tasks align with regulatory standards.

Once a performance metric is selected, the system applies targeted optimization techniques. In an embodiment, to optimize for project duration, the system might implement a critical-path algorithm to identify and prioritize the sequence of tasks that directly affect the project's completion date. For example, if excavation and foundation pouring are sequential tasks on the critical path, the system would ensure that resources for these tasks are allocated and scheduled to proceed without interruption. Additionally, tasks outside the critical path, such as landscaping or minor interior work, may be deferred or scheduled in parallel to reduce their impact on the overall timeline. By focusing resources and personnel on the critical-path activities, the system effectively minimizes the total project duration.

In an embodiment, when resource utilization is the primary metric, the system may apply a resource leveling algorithm to distribute labor and equipment evenly across the project timeline, preventing overstaffing or underutilization. For instance, if the system detects that heavy machinery, such as a crane, is scheduled for multiple tasks across overlapping zones, it can allocate the crane to operate sequentially in each zone based on task priority and required timeline. This approach reduces downtime for the crane and ensures it is continuously in use. Additionally, the system can adjust workforce assignments to balance workload across project phases, ensuring that personnel are neither idle nor overburdened at any point, which enhances overall resource efficiency.

In an embodiment, when compliance adherence is prioritized, the system leverages the dimensional calculations model to ensure each task meets regulatory and safety standards. For example, if local building codes require specific safety clearances in confined spaces, the system identifies tasks that occur in these zones and sequences them to avoid simultaneous occupation, reducing risk. Moreover, the system can apply compliance-specific checks, such as load-bearing limits or environmental regulations, to adjust scheduling. If a structural task exceeds the regulatory load-bearing capacity in a particular phase, the system might reassign materials or delay specific tasks until reinforcing steps are completed, ensuring that the project adheres to all compliance requirements without unnecessary delays.

In accordance with various embodiments, a performance metric can be composed of two or more sub-metrics that collectively define the optimization goal. For instance, the "resource utilization" performance metric might include sub-metrics such as "equipment usage rate" and "labor distribution efficiency," which are separately optimized to achieve overall efficient resource use. Similarly, the "project duration" metric could include sub-metrics like "task completion speed" and "downtime minimization," allowing the system to adjust both task scheduling and resource allocation to reduce total project time.

Consider a scenario where the system is tasked with optimizing "resource utilization" as the primary performance metric, which includes two sub-metrics: equipment usage rate and labor distribution efficiency. The system might first analyze the equipment usage rate to ensure high-demand resources like cranes and excavators are used consistently across tasks, minimizing idle time. Next, the system evaluates labor distribution efficiency, balancing workload among available personnel to avoid bottlenecks or underutilization. By concurrently optimizing both sub-metrics, the system ensures that equipment and labor resources are used effectively, reducing overall project costs and preventing scheduling delays associated with underutilized resources.

At step 708, the system evaluates the generated project plan to determine if it meets predefined optimization criteria. In some cases, this evaluation may focus on a single optimization criterion, such as timeline adherence, where the system checks if all tasks are scheduled to meet the critical project milestones. For example, if the project plan fails to meet the timeline requirement, the system may adjust the sequence of tasks along the critical path, reallocating resources or rescheduling certain activities to shorten the project duration without compromising other project constraints.

In other scenarios, the evaluation may involve multiple criteria, where the system considers a combination of performance metrics, such as budget adherence and resource utilization. For instance, if the system detects that both criteria are not met, it may adjust the project plan by balancing cost-effective materials and optimizing labor schedules. A technical example could involve reducing workforce hours in non-critical phases to lower costs while simultaneously ensuring that high-demand equipment is efficiently scheduled to prevent idle time, thereby meeting both budget and resource utilization criteria.

A decision is made 710 whether the plan satisfies these criteria. In the situation a decision is made that the plan satisfies these criteria ("Yes" path), it moves to step 712, where the optimized plan is finalized and prepared for dissemination through the report and visualization system 140. However, if the plan does not meet the criteria ("No" path), the system may return to previous steps, such as adjusting constraints or recalibrating the optimization parameters, to refine the project plan. For instance, if the timeline exceeds a critical milestone, the system might reassign tasks to alternative resources or adjust the task sequence to enhance workflow efficiency by reordering non-dependent tasks.

At step 712, the system finalizes the optimized project plan, making it accessible for review and implementation. The finalized plan provides a structured outline of tasks, resource allocations, and scheduling in alignment with the project objectives and constraints. Through the report and visualization system 140, users can interact with the optimized plan, examining details like spatial task allocations, timeline phases, and resource commitments. This integration of multi-dimensional data allows stakeholders to visualize the project scope and gain insights into how tasks are interdependent within the spatial and temporal framework. For instance, users may view color-coded spatial zones to quickly assess resource allocations across different project phases or utilize an interactive timeline to analyze resource usage and potential bottlenecks over the project's duration.

Figure 8:
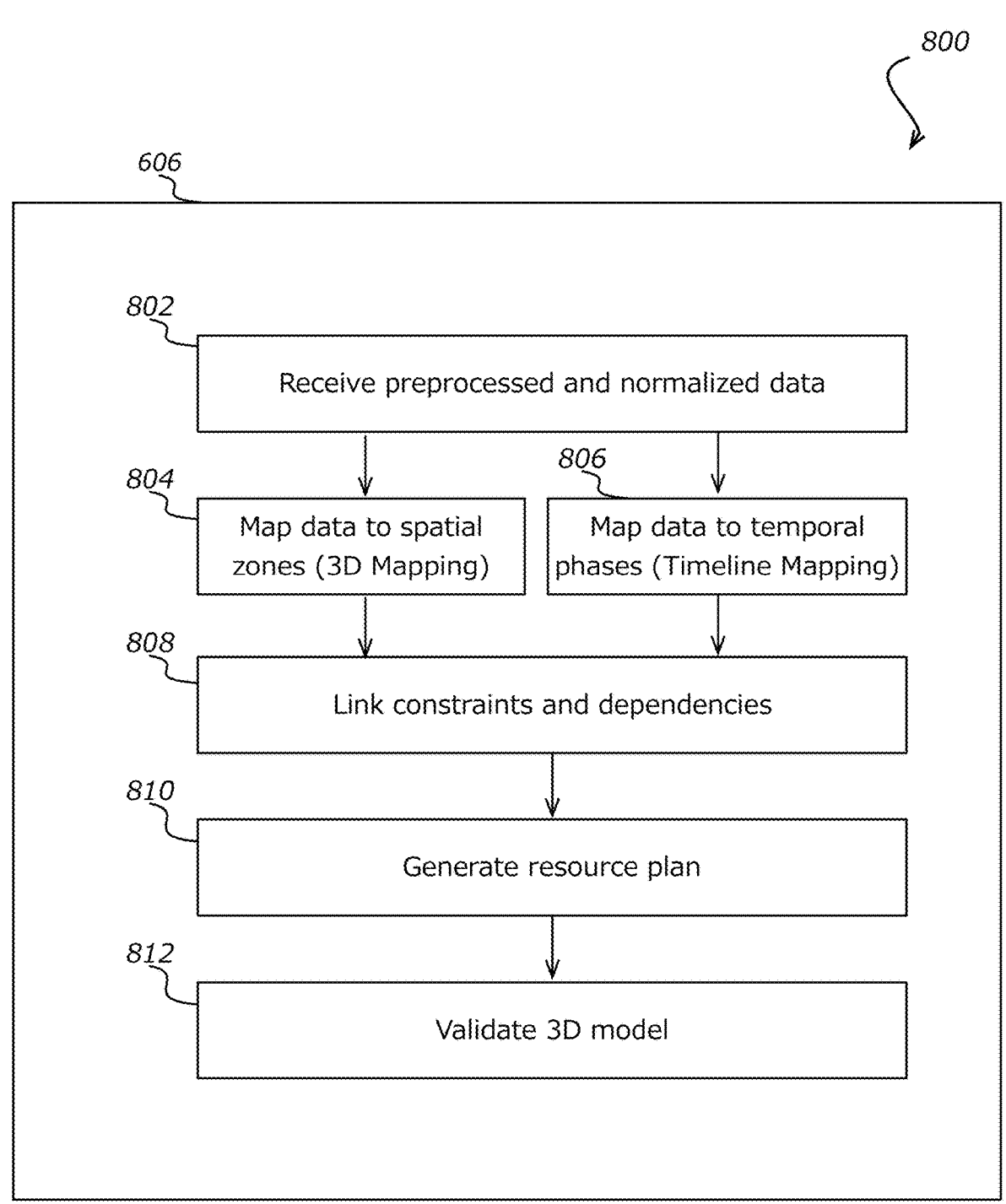
FIG. 8 illustrates an example process for building and mapping data to a three-dimensional model in accordance with various embodiments.

FIG. 8 provides further detail on step 606 from FIG. 6, illustrating an exemplary process 800 for mapping normalized data to a dimensional calculations model in accordance with various embodiments. This process allows the system to organize and integrate project data across spatial, temporal, and regulatory dimensions, ensuring a comprehensive approach to structural planning and resource scheduling. As described, dimensional calculations differ from traditional 3D models by encompassing not only physical layout but also constraints and dependencies critical for effective project execution.

At step 802, the system receives preprocessed and normalized data, which may include spatially relevant project data, material specifications, regulatory requirements, and scheduling information. In an embodiment, this data can be formatted consistently within the data modeling system 132, enabling downstream components to interpret and use the information uniformly.

At step 804, the normalized data is mapped to spatial zones within a three-dimensional framework, referred to here as "3D Mapping." In an embodiment, using spatial mapper 217, the system allocates resources, activities, and project components to specific zones within the project environment. For example, the spatial mapper 217 may assign structural components like beams, walls, and supports to defined areas within the model, correlating these placements with physical spaces in the construction layout. This step ensures that all project elements are organized within the spatial dimensions required for accurate construction planning.

At step 806, the system maps data to temporal phases, labeled as "Timeline Mapping." In an embodiment, the temporal mapper 219 organizes activities, tasks, and resource allocations according to project phases and timelines. This involves associating each activity with specific time intervals, ensuring that the construction process is planned sequentially. For instance, tasks like foundation work, framing, and electrical installation are scheduled in an optimal order to prevent delays and resource conflicts. This timeline mapping step allows the system to coordinate project activities in accordance with both spatial placements and scheduled phases.

At step 808, the system links relevant constraints and dependencies to the mapped data. This step involves constraint mapper 221, which integrates project-specific requirements, such as load-bearing restrictions, safety guidelines, and zoning codes, into the dimensional calculations model. For example, the constraint mapper may enforce regulations requiring fire-resistant materials in specific zones or impose height restrictions in areas with building code limitations. This ensures that mapped elements are compliant with regulatory standards and that dependencies between tasks are accounted for, preventing sequencing errors or regulatory non-compliance.

At step 810, the system generates a resource plan, outlining the allocation of materials, labor, and equipment necessary for each project phase. Based on the dimensional calculations model, the resource plan accounts for spatial zones, timelines, and constraints to ensure optimal use of resources. For instance, if specific materials like concrete or rebar are needed in one zone during a particular phase, the resource plan coordinates their availability in line with the project's timeline and spatial layout.

At step 812, the system validates the dimensional calculations model, ensuring that the spatial, temporal, and regulatory mappings are coherent and meet project specifications. This validation process includes checks to confirm that mapped data does not violate spatial constraints, temporal dependencies, or regulatory requirements. If discrepancies are detected, the system may flag these issues for review, allowing for adjustments before project execution. This validation ensures that the generated model is ready for integration into the larger project execution plan, enabling precise, compliant, and efficient project workflows.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, units, modules, engines, controllers, interfaces, components, or the like may comprise hardware and/or software as described herein. For example, the system described in association with data modeling system 132, planning and optimization system 134, machine learning system 136, recommendation engine 138, report and visualization system 140, and associated data stores such as project data store 230 and material data store 232, may comprise computing hardware and/or software as described herein in association with the figures. Additionally, any of the above-mentioned systems, units, modules, engines, controllers, interfaces, components, or the like may utilize and/or comprise an application programming interface (API) for communicating with other systems, units, modules, engines, controllers, interfaces, components, or the like to obtain and/or provide data or information as necessary for project data processing, dimensional calculations, and optimization within the described system architecture.

Figure 9:
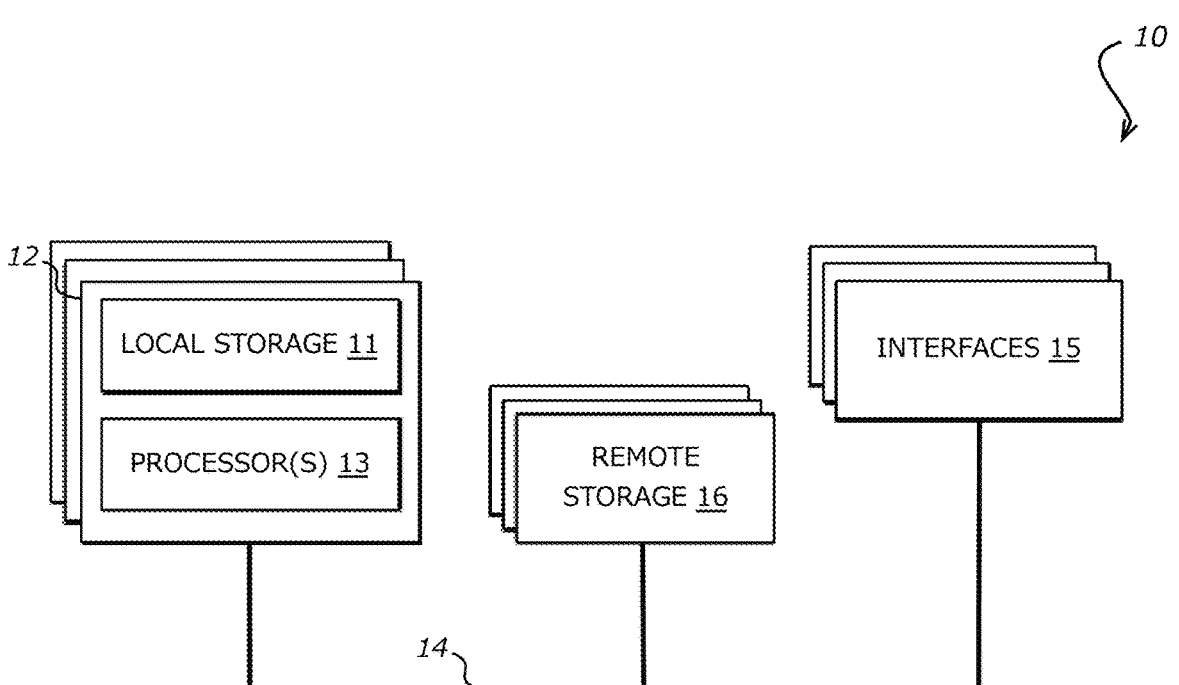
FIG. 9 illustrates one embodiment of the computing architecture that supports an embodiment of the inventive disclosure.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
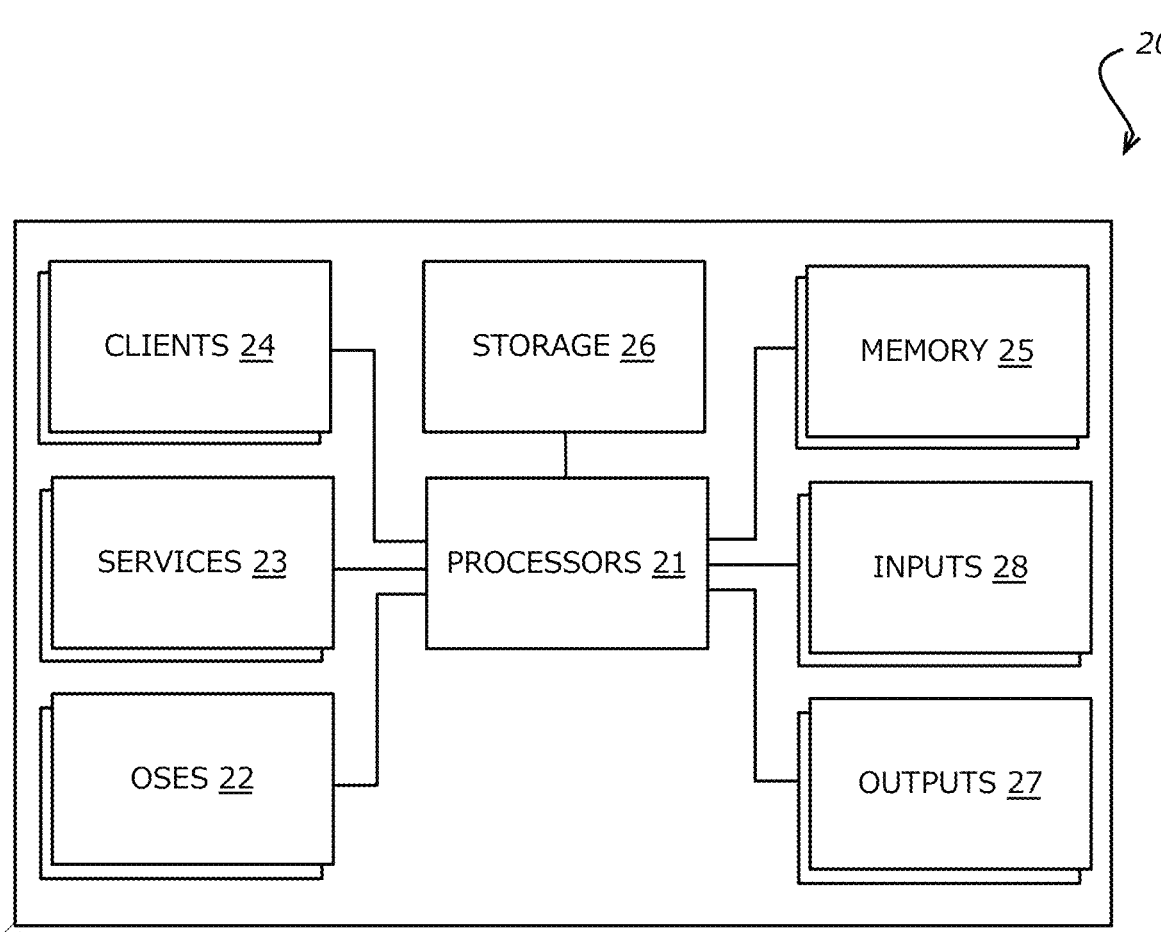
FIG. 10 illustrates components of a system architecture that supports an embodiment of the inventive disclosure.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
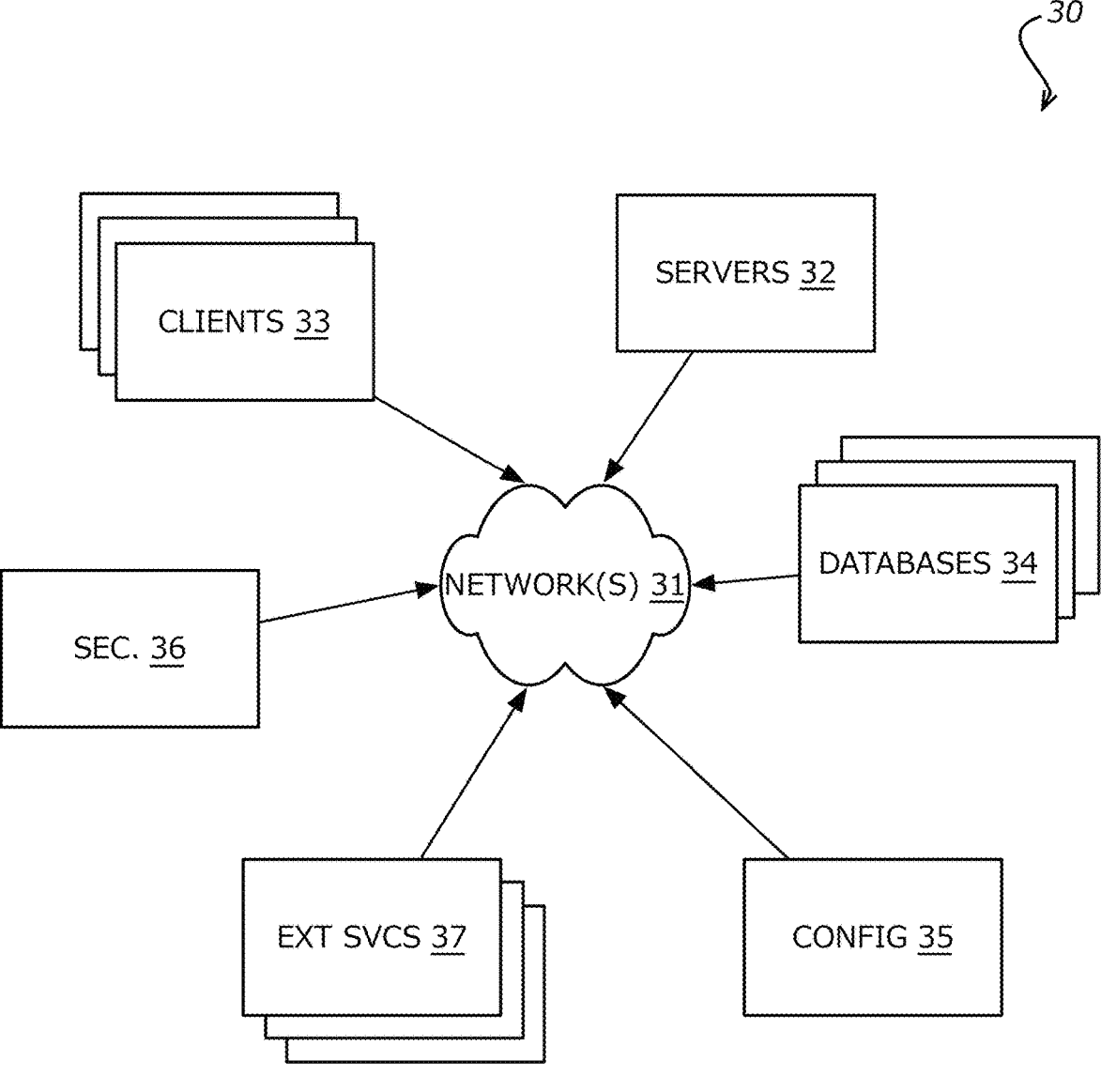
FIG. 11 illustrates components of a computing device that supports an embodiment of the inventive disclosure.

In some embodiments, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 12:
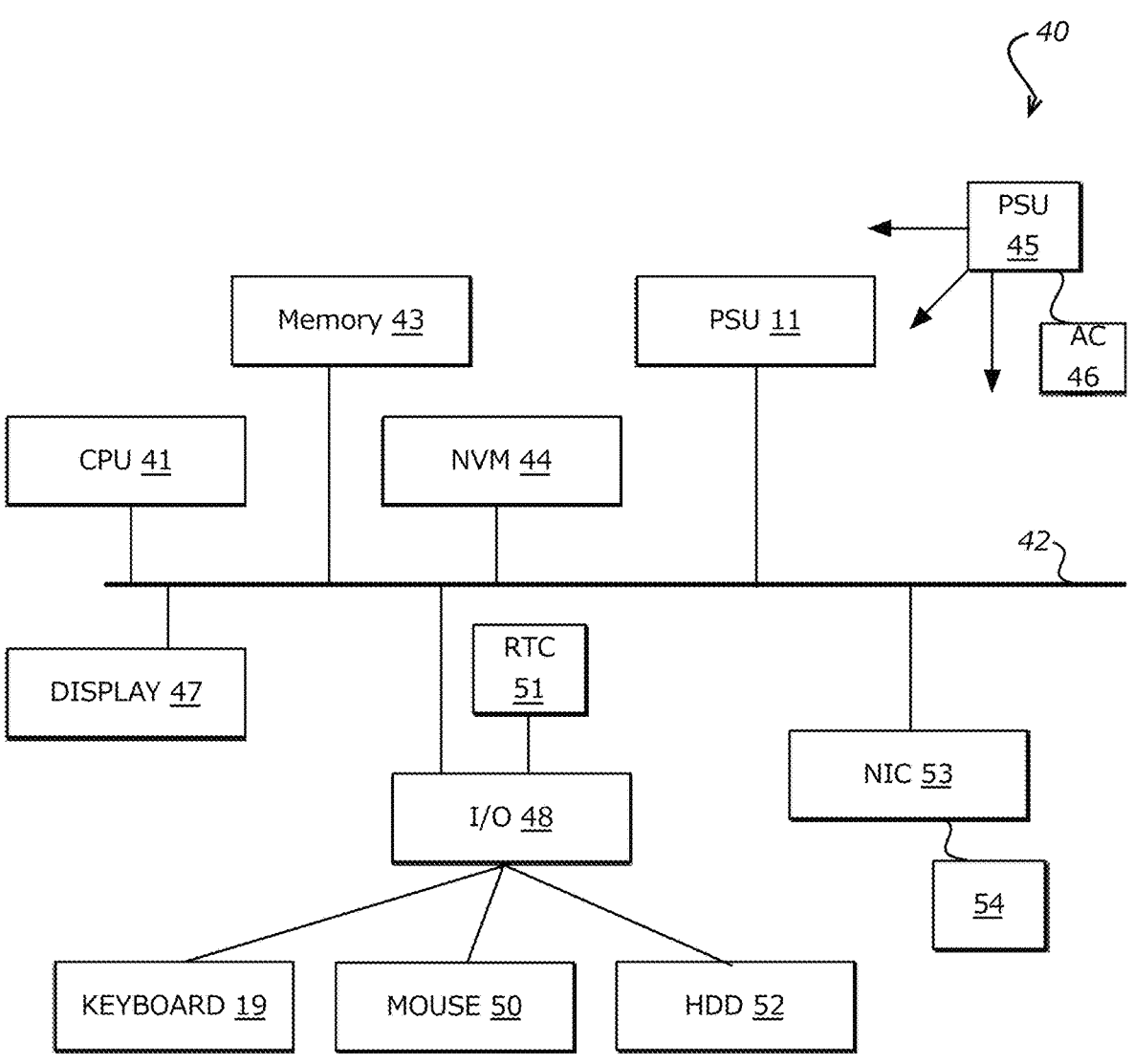
FIG. 12 illustrates components of a computing device that supports an embodiment of the inventive disclosure.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system, comprising:

a computing device processor; and a memory device including instructions that, when executed by the computing device processor, enable the computing system to:

receive unstructured project-related data from heterogeneous sources;

apply parsing logic using pattern matching and contextual analysis to identify project components and planning dimensions within the unstructured project-related data;

normalize the unstructured project-related data using schema-aligned transformation rules based on the project components and the planning dimensions within a unified schema to generate normalized data;

map the normalized data to a dimensional calculations model to identify project execution tasks and associated constraint types;

apply the dimensional calculations model to integrate spatial, temporal, and regulatory parameters, aligning the normalized data with spatial zones, temporal phases, and operational constraints to generate a constraint-mapped project representation;

apply a trained model to the constraint-mapped project representation to evaluate constraint relationships and determine task interdependencies and resource availability;

extract task interdependencies among project execution tasks identified by the trained model based on the constraint-mapped project representation, the constraint relationships comprising resource availability, zone-phase allocation, and temporal sequence constraints;

apply a structured inference layer comprising deterministic rule-based logic and executable inference rules, the structured inference layer operable to implement the deterministic rule-based logic on trained-model output vectors to resolve task interdependencies into actionable scheduling and resource constraints not derivable by the trained-model output vectors alone;

generate a task execution sequence based on the resolved task interdependencies and resource availability;

automatically generate a machine-structured project execution plan including task sequence and resource assignment instructions based on the resolved task interdependencies, spatial zones, temporal phases, and regulatory constraint parameters derived from the constraint-mapped project representation;

iteratively refine the machine-structured project execution plan by applying a feedback process that evaluates one or more machine-computed performance criteria and automatically adjusts the task execution sequence or resource assignments in response to evaluated machine-computed performance criteria, wherein the machine-structured project execution plan is updated in real time as new constraint data are ingested; and generate, via the computing device processor, updated machine-readable execution instructions incorporating refinements generated by the feedback process for interactive presentation through a visualization interface.

2. The computing system of claim 1, wherein the unstructured project-related data comprises two-dimensional (2D) drawings, three-dimensional (3D) data models, cost information, and workforce logistics.

3. The computing system of claim 1, wherein normalizing the unstructured project-related data within the unified schema includes converting different units of measurement, aligning data formats, and applying standard terminology across data sources.

4. The computing system of claim 1, wherein mapping the normalized data to the dimensional calculations model comprises:

assigning spatial data to predefined zones within a three-dimensional framework;

associating temporal data with project phases on a defined timeline; and linking material quantities to specific zones, construction activities, and phases.

5. The computing system of claim 1, wherein the dimensional calculations model utilizes spatial mapper, temporal mapper, and constraint mapper components to align data according to spatial zones, temporal phases, and regulatory parameters, respectively.

6. The computing system of claim 5, wherein:

the spatial mapper allocates project data to specific spatial zones by associating location-based attributes with designated areas within a project environment in a multi-dimensional framework, wherein location-based attributes includes at least on of building codes or material specifications;

the temporal mapper organizes project tasks into sequential phases by aligning task start and end dates with a project timeline and incorporating dependencies between tasks; and the constraint mapper applies regulatory and safety constraints to the mapped data by enforcing compliance checks to ensure adherence to applicable standards for each spatial zone and project phase, wherein compliance checks includes at least one of maximum load limits, safety clearances, or zoning restrictions.

7. The computing system of claim 5, wherein the dimensional calculations model is configured to analyze dependencies among mapped spatial zones and associated temporal phases to detect and resolve scheduling conflicts within a project timeline.

8. The computing system of claim 1, wherein the machine-structured project execution plan, refined, is optimized based on at least one performance metric, the at least one performance metric being selected from project duration, resource utilization, and compliance adherence.

9. The computing system of claim 8, wherein the at least one performance metric includes multiple sub-metrics.

10. The computing system of claim 1, wherein optimization of the machine-structured project execution plan is performed through iterative adjustments to task sequencing, resource scheduling, or regulatory alignment.

11. The computing system of claim 1, wherein the visualization interface is operable to display the machine-structured project execution plan, including interactive elements for viewing spatial zones, adjusting schedules, and reviewing constraint adherence, and wherein the visualization interface includes interactive elements configured to enable scenario modeling, allowing users to modify spatial zones, task schedules, or resource allocations and view potential impact on project performance metrics.

12. A computer-implemented method, comprising:

receiving unstructured project-related data from heterogeneous sources;

applying parsing logic using pattern matching and contextual analysis to identify project components and planning dimensions within the unstructured project-related data;

normalizing the unstructured project-related data using schema-aligned transformation rules based on the project components and the planning dimensions within a unified schema to generate normalized data;

mapping the normalized data to a dimensional calculations model to identify project execution tasks and associated constraint types;

applying the dimensional calculations model to integrate spatial, temporal, and regulatory parameters, aligning the normalized data with spatial zones, temporal phases, and operational constraints to generate a constraint-mapped project representation;

applying a trained model to the constraint-mapped project representation to evaluate constraint relationships and determine task interdependencies and resource availability;

extracting task interdependencies among project execution tasks identified by the trained model based on the constraint-mapped project representation, the constraint relationships comprising resource availability, zone-phase allocation, and temporal sequence constraints;

applying a structured inference layer comprising deterministic rule-based logic and executable inference rules, the structured inference layer operable to implement the deterministic rule-based logic on trained-model output vectors to resolve task interdependencies into actionable scheduling and resource constraints not derivable by the trained-model output vectors alone;

generating a task execution sequence based on the resolved task interdependencies and resource availability;

automatically generating a machine-structured project execution plan including task sequence and resource assignment instructions based on the resolved task interdependencies, spatial zones, temporal phases, and regulatory constraint parameters derived from the constraint-mapped project representation;

iteratively refine the machine-structured project execution plan by applying a feedback process that evaluates one or more machine-computed performance criteria and automatically adjusts the task execution sequence or resource assignments in response to evaluated machine-computed performance criteria, wherein the machine-structured project execution plan is updated in real time as new constraint data are ingested; and generating, via the computing device processor, updated machine-readable execution instructions incorporating refinements generated by the feedback process for interactive presentation through a visualization interface.

13. The computer-implemented method of claim 12, wherein the mapping includes:

assigning spatial data to predefined zones within a three-dimensional framework;

associating temporal data with project phases on a defined timeline; and linking material quantities to specific zones, construction activities, and phases.

14. The computer-implemented method of claim 12, wherein the dimensional calculations model utilizes spatial mapper, temporal mapper, and constraint mapper components to align data according to spatial zones, temporal phases, and regulatory parameters, respectively.

15. The computer-implemented method of claim 14, wherein, the spatial mapper allocates project data to specific spatial zones by associating location-based attributes with designated areas within a project environment in a multi-dimensional framework, wherein location-based attributes includes at least on of building codes or material specifications;

the temporal mapper organizes project tasks into sequential phases by aligning task start and end dates with a project timeline and incorporating dependencies between tasks; and the constraint mapper applies regulatory and safety constraints to the mapped data by enforcing compliance checks to ensure adherence to applicable standards for each spatial zone and project phase, wherein compliance checks includes at least one of maximum load limits, safety clearances, or zoning restrictions.

16. The computer-implemented method of claim 15, wherein the dimensional calculations model is configured to analyze dependencies among mapped spatial zones and associated temporal phases to detect and resolve scheduling conflicts within the project timeline.

17. The computer-implemented method of claim 15, wherein the dimensional calculations model is configured to analyze dependencies among mapped spatial zones and associated temporal phases to detect and resolve scheduling conflicts within the project timeline.

18. The computer-implemented method of claim 12, further comprising:

iteratively optimizing the machine-structured project execution plan based on at least one performance metric, the at least one performance metric being selected from project duration, resource utilization, and compliance adherence.

19. The computer-implemented method of claim 18, wherein the at least one performance metric includes multiple sub-metrics.

20. A non-transitory computer-readable storage medium storing instructions that, when executed by at least one processor of a computing system, causes the computing system to:

receive unstructured project-related data from heterogeneous sources;

apply parsing logic using pattern matching and contextual analysis to identify project components and planning dimensions within the unstructured project-related data;

normalize the unstructured project-related data using schema-aligned transformation rules based on the project components and the planning dimensions within a unified schema to generate normalized data;

map the normalized data to a dimensional calculations model to identify project execution tasks and associated constraint types;

apply the dimensional calculations model to integrate spatial, temporal, and regulatory parameters, aligning the normalized data with spatial zones, temporal phases, and operational constraints to generate a constraint-mapped project representation;

apply a trained model to the constraint-mapped project representation to evaluate constraint relationships and determine task interdependencies and resource availability;

extract task interdependencies among project execution tasks identified by the trained model based on the constraint-mapped project representation, the constraint relationships comprising resource availability, zone-phase allocation, and temporal sequence constraints;

apply a structured inference layer comprising deterministic rule-based logic and executable inference rules, the structured inference layer operable to implement the deterministic rule-based logic on trained-model output vectors to resolve task interdependencies into actionable scheduling and resource constraints not derivable by the trained-model output vectors alone;

generate a task execution sequence based on the resolved task interdependencies and resource availability;

automatically generate a machine-structured project execution plan including task sequence and resource assignment instructions based on the resolved task interdependencies, spatial zones, temporal phases, and regulatory constraint parameters derived from the constraint-mapped project representation;

iteratively refine the machine-structured project execution plan by applying a feedback process that evaluates one or more machine-computed performance criteria and automatically adjusts the task execution sequence or resource assignments in response to evaluated machine-computed performance criteria, wherein the machine-structured project execution plan is updated in real time as new constraint data are ingested; and generate, via the computing device processor, updated machine-readable execution instructions incorporating refinements generated by the feedback process for interactive presentation through a visualization interface.

* * * * *